(12) United States Patent
Pervan et al.

(10) Patent No.: US 10,221,576 B2
(45) Date of Patent: Mar. 5, 2019

(54) MECHANICAL LOCKING SYSTEM FOR FLOOR PANELS

(71) Applicant: CERALOC INNOVATION AB, Viken (SE)

(72) Inventors: Darko Pervan, Viken (SE); Tony Pervan, Stockholm (SE)

(73) Assignee: CERALOC INNOVATION AB, Viken (SE)

( * ) Notice: Subject to any disclaimer, the term of this patent is extended or adjusted under 35 U.S.C. 154(b) by 0 days.

(21) Appl. No.: 15/584,869

(22) Filed: May 2, 2017

(65) Prior Publication Data

US 2017/0234020 A1    Aug. 17, 2017

Related U.S. Application Data

(63) Continuation of application No. 14/988,262, filed on Jan. 5, 2016, now Pat. No. 9,657,483, which is a
(Continued)

(51) Int. Cl.
*E04F 15/04* (2006.01)
*E04F 15/02* (2006.01)
(Continued)

(52) U.S. Cl.
CPC .............. *E04F 15/04* (2013.01); *E04F 15/02* (2013.01); *E04F 15/02038* (2013.01);
(Continued)

(58) Field of Classification Search
CPC ..... E04F 15/02; E04F 15/02038; E04F 15/04; E04F 15/105; E04F 2201/0115;
(Continued)

(56) References Cited

U.S. PATENT DOCUMENTS

| 87,853 A | * | 3/1869 | Kappes | .................... E04F 15/04 |
| | | | | 52/592.1 |
| 108,068 A | * | 10/1870 | Utley | ...................... E04F 15/10 |
| | | | | 52/541 |

(Continued)

FOREIGN PATENT DOCUMENTS

| CN | 201588375 U | 9/2010 |
| CN | 102383575 A | 3/2012 |

(Continued)

OTHER PUBLICATIONS

U.S. Appl. No. 14/902,706, filed Jan. 4, 2016, Darko Pervan.
(Continued)

*Primary Examiner* — James M Ference
(74) *Attorney, Agent, or Firm* — Buchanan Ingersoll & Rooney P.C.

(57) ABSTRACT

Building panels, especially floor panels, which are provided with a locking system including several separate strip parts connected to the panel edge. A strip part, configured to lock panels horizontally and to be fixed to a panel edge, including a strip body with an inner part configured to be fixed under the panel edge and an outer part configured to extend outside the panel edge, wherein the inner part comprises a fixing element configured to lock the strip part to the panel edge in a horizontal direction, wherein the outer part including a locking protrusion, located above the strip body and configured to lock the strip part to the panel edge vertically and a locking element configured to lock the panels in a horizontal direction, and wherein the inner part includes a cavity formed in the strip body and located between the fixing element and the locking protrusion.

26 Claims, 21 Drawing Sheets

Related U.S. Application Data continuation of application No. 14/294,564, filed on Jun. 3, 2014, now Pat. No. 9,243,411, which is a continuation of application No. 13/585,485, filed on Aug. 14, 2012, now Pat. No. 8,763,340.

(60) Provisional application No. 61/523,602, filed on Aug. 15, 2011.

(51) Int. Cl.
  *F16B 5/00* (2006.01)
  *E04F 15/10* (2006.01)

(52) U.S. Cl.
  CPC .......... *F16B 5/0016* (2013.01); *E04F 15/105* (2013.01); *E04F 2201/0107* (2013.01); *E04F 2201/0115* (2013.01); *E04F 2201/0138* (2013.01); *E04F 2201/0146* (2013.01); *E04F 2201/0153* (2013.01); *E04F 2201/0161* (2013.01); *E04F 2201/023* (2013.01); *E04F 2201/049* (2013.01); *E04F 2201/0535* (2013.01); *Y10T 428/24479* (2015.01)

(58) Field of Classification Search
  CPC ...... E04F 2201/0146; E04F 2201/0153; E04F 2201/0161; E04F 2201/023; E04F 2201/0535; E04F 2201/0107; E04F 2201/0138; E04F 2201/049; F16B 5/0016; Y10T 428/24479
  See application file for complete search history.

(56) References Cited

U.S. PATENT DOCUMENTS

| | | | | |
|---|---|---|---|---|
| 213,740 A * | 4/1879 | Conner | ............................. | 52/503 |
| 274,354 A * | 3/1883 | McCarthy et al. | ...... | E04F 15/10 52/591.4 |
| 876,693 A * | 1/1908 | Coldwell | ................ | E04F 21/22 254/15 |
| 2,110,728 A | 3/1938 | Hoggatt | | |
| 2,430,200 A | 11/1947 | Wilson | | |
| 2,889,016 A * | 6/1959 | Warren | ...................... | F16B 5/02 52/633 |
| 3,099,110 A * | 7/1963 | Spaight | ................. | E04B 1/6812 109/1 S |
| 3,147,522 A * | 9/1964 | Schumm | ............ | B65D 63/1081 24/16 PB |
| 3,187,612 A | 6/1965 | Hervey | | |
| 3,731,445 A * | 5/1973 | Hoffmann | ............... | E04F 15/02 52/391 |
| 3,939,546 A * | 2/1976 | Hernandez | .............. | E04F 21/22 254/11 |
| 4,169,688 A | 10/1979 | Toshio | | |
| 4,426,820 A | 1/1984 | Terbrack et al. | | |
| 4,447,172 A * | 5/1984 | Galbreath | ................ | E01D 19/06 404/65 |
| 4,512,131 A | 4/1985 | Laramore | | |
| 4,599,841 A | 7/1986 | Haid | | |
| 4,819,932 A * | 4/1989 | Trotter, Jr. | ............ | E04F 15/225 472/92 |
| 5,135,597 A * | 8/1992 | Barker | ....................... | B27B 1/00 144/345 |
| 5,272,850 A * | 12/1993 | Mysliwiec | ............ | E04B 1/6158 52/582.2 |
| 5,295,341 A * | 3/1994 | Kajiwara | ............. | E04B 1/6129 404/41 |
| 5,435,610 A * | 7/1995 | Roberts | ................... | E04F 21/22 254/11 |
| 5,485,702 A * | 1/1996 | Sholton | ..................... | E04C 1/42 52/307 |
| 5,577,357 A * | 11/1996 | Civelli | ................... | E04B 2/702 52/233 |
| 5,845,548 A * | 12/1998 | Nelson | .................... | E04F 21/22 254/11 |
| 5,860,267 A * | 1/1999 | Pervan | ................ | E04F 13/0801 52/403.1 |
| 5,950,389 A | 9/1999 | Porter | | |
| 5,970,675 A * | 10/1999 | Schray | .................. | E04B 1/6137 160/135 |
| 6,006,486 A | 12/1999 | Moriau et al. | | |
| 6,094,882 A * | 8/2000 | Pervan | ..................... | E04F 15/04 29/897.3 |
| 6,182,410 B1 | 2/2001 | Pervan | | |
| 6,203,653 B1 * | 3/2001 | Seidner | ................ | B27M 3/0053 144/344 |
| 6,205,639 B1 * | 3/2001 | Pervan | .................... | B23P 11/00 29/509 |
| 6,254,301 B1 * | 7/2001 | Hatch | ..................... | F16B 13/00 403/266 |
| 6,295,779 B1 * | 10/2001 | Canfield | .................... | E06B 1/32 49/504 |
| 6,332,733 B1 * | 12/2001 | Hamberger | ............. | C08L 25/12 403/274 |
| 6,339,908 B1 * | 1/2002 | Chuang | .................. | E04F 15/04 52/177 |
| 6,358,352 B1 * | 3/2002 | Schmidt | .................... | B07C 5/14 144/344 |
| 6,418,683 B1 | 7/2002 | Martensson et al. | | |
| 6,449,918 B1 * | 9/2002 | Nelson | .................... | E04F 15/04 52/570 |
| 6,450,235 B1 * | 9/2002 | Lee | ........................... | B27L 5/00 160/236 |
| 6,490,836 B1 | 12/2002 | Moriau et al. | | |
| 6,550,206 B2 * | 4/2003 | Lee | ......................... | E04F 15/04 52/403.1 |
| 6,576,079 B1 * | 6/2003 | Kai | .......................... | B27L 5/00 144/346 |
| 6,584,747 B2 * | 7/2003 | Kettler | ................... | E04F 15/02 52/592.2 |
| 6,591,568 B1 | 7/2003 | Pålsson | | |
| 6,681,820 B2 * | 1/2004 | Olofsson | ................ | B23D 37/04 144/134.1 |
| 6,685,391 B1 * | 2/2004 | Gideon | .................... | E01C 3/06 405/16 |
| 6,729,091 B1 | 5/2004 | Martensson | | |
| 6,763,643 B1 | 7/2004 | Martensson | | |
| 6,802,166 B1 * | 10/2004 | Gerhard | ................. | E04F 15/04 52/403.1 |
| 6,851,241 B2 | 2/2005 | Pervan | | |
| 6,854,235 B2 | 2/2005 | Martensson | | |
| 6,880,307 B2 | 4/2005 | Schwitte et al. | | |
| 7,040,068 B2 | 5/2006 | Moriau et al. | | |
| 7,051,486 B2 | 5/2006 | Pervan | | |
| 7,108,031 B1 * | 9/2006 | Secrest | ................... | B27M 1/003 144/1.1 |
| 7,171,790 B2 * | 2/2007 | Mei | ........................ | E04F 15/04 52/578 |
| 7,243,470 B2 * | 7/2007 | Chae | .................... | E04F 13/0814 52/480 |
| 7,257,926 B1 * | 8/2007 | Kirby | .................. | E04F 21/0092 33/526 |
| 7,637,068 B2 | 12/2009 | Pervan | | |
| 7,654,055 B2 * | 2/2010 | Ricker | ................ | A47B 47/0075 52/582.2 |
| 7,677,005 B2 | 3/2010 | Pervan | | |
| 7,716,889 B2 * | 5/2010 | Pervan | ................... | E04F 15/02 52/392 |
| 7,757,452 B2 | 7/2010 | Pervan | | |
| 7,805,903 B2 | 10/2010 | Liu | | |
| 7,841,150 B2 | 11/2010 | Pervan | | |
| 7,908,815 B2 * | 3/2011 | Pervan | .................... | E04F 15/02 428/50 |
| 7,980,039 B2 * | 7/2011 | Groeke | ................... | E04F 15/02 403/350 |
| 8,156,705 B2 | 4/2012 | Alford et al. | | |
| 8,181,416 B2 * | 5/2012 | Pervan | .................... | E04F 15/02 52/586.1 |
| 8,234,830 B2 * | 8/2012 | Pervan | ................ | E04F 13/0894 52/582.1 |

(56) References Cited

U.S. PATENT DOCUMENTS

| | | | |
|---|---|---|---|
| 8,276,343 B2 | 10/2012 | Yang | |
| 8,302,367 B2* | 11/2012 | Schulte | E04F 15/02 428/50 |
| 8,336,272 B2* | 12/2012 | Prager | F16B 5/0044 52/588.1 |
| 8,341,915 B2* | 1/2013 | Pervan | E04F 15/02038 52/396.04 |
| 8,429,870 B2 | 4/2013 | Chen et al. | |
| 8,448,402 B2* | 5/2013 | Pervan | E04F 15/02 428/50 |
| 8,650,826 B2 | 2/2014 | Pervan | |
| 8,733,410 B2 | 5/2014 | Pervan | |
| 8,763,340 B2 | 7/2014 | Pervan et al. | |
| 9,243,411 B2 | 1/2016 | Pervan et al. | |
| 9,314,936 B2 | 4/2016 | Pervan | |
| 9,657,483 B2 | 5/2017 | Pervan et al. | |
| 10,041,258 B2 | 8/2018 | Pervan | |
| 2001/0010139 A1* | 8/2001 | De Kerpel | E04B 9/26 52/479 |
| 2001/0024707 A1* | 9/2001 | Andersson | E04F 15/02 428/60 |
| 2002/0095894 A1* | 7/2002 | Pervan | E04F 15/02 52/391 |
| 2003/0037504 A1 | 2/2003 | Schwitte et al. | |
| 2003/0084636 A1* | 5/2003 | Pervan | E04F 15/04 52/592.1 |
| 2003/0180091 A1 | 9/2003 | Stridsman | |
| 2004/0016196 A1* | 1/2004 | Pervan | E04F 15/04 52/578 |
| 2004/0139676 A1* | 7/2004 | Knauseder | E04F 15/02 52/578 |
| 2004/0182033 A1* | 9/2004 | Wernersson | E04F 15/02 52/578 |
| 2004/0206036 A1* | 10/2004 | Pervan | A47G 27/0293 52/578 |
| 2004/0211143 A1* | 10/2004 | Hanning | E04F 15/02 52/578 |
| 2004/0244325 A1 | 12/2004 | Nelson | |
| 2004/0250492 A1* | 12/2004 | Becker | E04F 15/04 52/578 |
| 2005/0028474 A1* | 2/2005 | Kim | E04F 15/04 52/578 |
| 2005/0050827 A1* | 3/2005 | Schitter | B44C 5/043 52/578 |
| 2005/0102937 A1 | 5/2005 | Pervan | |
| 2005/0160694 A1* | 7/2005 | Pervan | B27F 1/02 52/582.1 |
| 2005/0252130 A1* | 11/2005 | Martensson | E04F 15/02 52/384 |
| 2006/0070333 A1 | 4/2006 | Pervan | |
| 2006/0156670 A1* | 7/2006 | Knauseder | E04F 15/02 52/578 |
| 2006/0236642 A1* | 10/2006 | Pervan | E04F 15/02 52/578 |
| 2006/0260254 A1* | 11/2006 | Pervan | E04F 15/02 52/592.1 |
| 2007/0028547 A1 | 2/2007 | Grafenauer et al. | |
| 2007/0151189 A1* | 7/2007 | Yang | E04F 15/02 52/582.2 |
| 2007/0220822 A1 | 9/2007 | Permesang | |
| 2008/0028707 A1* | 2/2008 | Pervan | E04F 15/02 52/391 |
| 2008/0041008 A1 | 2/2008 | Pervan | |
| 2008/0110125 A1* | 5/2008 | Pervan | E04F 15/02 52/582.2 |
| 2008/0134607 A1* | 6/2008 | Pervan | E04F 15/02038 52/395 |
| 2008/0216434 A1 | 9/2008 | Pervan | |
| 2008/0216920 A1 | 9/2008 | Pervan | |
| 2009/0019806 A1* | 1/2009 | Muehlebach | E04F 15/02 52/588.1 |
| 2009/0056339 A1 | 3/2009 | Fischer et al. | |
| 2009/0107076 A1 | 4/2009 | Kim | |
| 2009/0133353 A1* | 5/2009 | Pervan | E04F 15/02 52/588.1 |
| 2009/0151290 A1* | 6/2009 | Liu | E04F 15/04 52/586.1 |
| 2009/0193741 A1* | 8/2009 | Cappelle | E04F 15/02 52/309.1 |
| 2009/0193748 A1* | 8/2009 | Boo | B27F 1/02 52/589.1 |
| 2010/0170189 A1* | 7/2010 | Schulte | B27M 3/04 52/745.19 |
| 2010/0173122 A1* | 7/2010 | Susnjara | A47B 47/042 428/119 |
| 2010/0300029 A1* | 12/2010 | Braun | E04F 15/02 52/588.1 |
| 2011/0016815 A1* | 1/2011 | Yang | E04F 15/02 52/396.04 |
| 2011/0113713 A1 | 5/2011 | Lui | |
| 2011/0131916 A1* | 6/2011 | Chen | E04F 15/02 52/588.1 |
| 2011/0167751 A1* | 7/2011 | Engstrom | E04F 15/02 52/588.1 |
| 2011/0197535 A1* | 8/2011 | Baker | E04B 1/6116 52/588.1 |
| 2011/0271632 A1* | 11/2011 | Cappelle | E04F 15/02 52/582.2 |
| 2012/0096801 A1* | 4/2012 | Cappelle | E04F 15/02038 52/592.1 |
| 2012/0192521 A1* | 8/2012 | Schulte | E04F 13/08 52/588.1 |
| 2013/0008117 A1* | 1/2013 | Pervan | E04F 15/02 52/588.1 |
| 2013/0014463 A1* | 1/2013 | Pervan | E04F 15/02038 52/588.1 |
| 2013/0019555 A1* | 1/2013 | Pervan | E04F 15/02038 52/588.1 |
| 2013/0036695 A1* | 2/2013 | Durnberger | E04F 15/02038 52/309.3 |
| 2013/0042562 A1* | 2/2013 | Pervan | E04F 15/02038 52/582.2 |
| 2013/0042563 A1* | 2/2013 | Pervan | E04F 15/02038 52/582.2 |
| 2013/0042564 A1* | 2/2013 | Pervan | E04F 13/0894 52/588.1 |
| 2013/0042565 A1* | 2/2013 | Pervan | E04F 15/02038 52/588.1 |
| 2013/0047536 A1* | 2/2013 | Pervan | B26D 1/14 52/309.1 |
| 2013/0055950 A1* | 3/2013 | Pervan | B05C 1/006 118/72 |
| 2013/0160390 A1* | 6/2013 | Stockl | E04F 15/02 52/588.1 |
| 2014/0223852 A1 | 8/2014 | Pervan | |
| 2014/0287194 A1 | 9/2014 | Pervan et al. | |
| 2014/0335273 A1 | 11/2014 | Haller | |
| 2016/0168865 A1 | 6/2016 | Pervan | |
| 2016/0201337 A1 | 7/2016 | Pervan et al. | |
| 2016/0237695 A1 | 8/2016 | Pervan | |
| 2018/0179764 A1 | 6/2018 | Pervan | |

FOREIGN PATENT DOCUMENTS

| | | |
|---|---|---|
| DE | 138 992 C | 7/1901 |
| DE | 142 293 C | 7/1902 |
| DE | 2 159 042 | 6/1973 |
| DE | 33 43 601 A1 | 6/1985 |
| DE | 33 43 601 C2 | 6/1985 |
| DE | 42 15 273 A1 | 11/1993 |
| DE | 42 42 530 A1 | 6/1994 |
| DE | 196 01 322 A | 5/1997 |
| DE | 200 02 744 U1 | 8/2000 |
| EP | 1 120 515 A1 | 8/2001 |
| EP | 1 146 182 A2 | 10/2001 |
| EP | 1 441 086 A1 | 7/2004 |
| EP | 1 640 530 A2 | 3/2006 |
| EP | 2 492 416 A1 | 8/2012 |
| FR | 2 810 060 A1 | 12/2001 |
| JP | 6-146553 A | 5/1994 |

(56) References Cited

FOREIGN PATENT DOCUMENTS

| WO | WO 94/26999 A1 | 11/1994 |
|---|---|---|
| WO | WO 96/27721 A1 | 9/1996 |
| WO | WO 97/47834 A1 | 12/1997 |
| WO | WO 98/21428 A1 | 5/1998 |
| WO | WO 99/66151 A1 | 12/1999 |
| WO | WO 99/66152 A1 | 12/1999 |
| WO | WO 00/20705 A1 | 4/2000 |
| WO | WO 00/20706 A1 | 4/2000 |
| WO | WO 00/47841 A1 | 8/2000 |
| WO | WO 01/07729 A1 | 2/2001 |
| WO | WO 01/48331 A1 | 7/2001 |
| WO | WO 01/51732 A1 | 7/2001 |
| WO | WO 01/75247 A1 | 10/2001 |
| WO | WO 01/98604 A1 | 12/2001 |
| WO | WO 02/055809 A1 | 7/2002 |
| WO | WO 02/055810 A1 | 7/2002 |
| WO | WO 02/081843 A1 | 10/2002 |
| WO | WO 03/016654 A1 | 2/2003 |
| WO | WO 03/038210 A1 | 5/2003 |
| WO | WO 03/083234 A1 | 10/2003 |
| WO | WO 2004/083557 A1 | 9/2004 |
| WO | WO 2004/085765 A1 | 10/2004 |
| WO | WO 2005/003489 A1 | 1/2005 |
| WO | WO 2005/040521 A2 | 5/2005 |
| WO | WO 2006/043893 A1 | 4/2006 |
| WO | WO 2006/104436 A1 | 10/2006 |
| WO | WO 2006/111518 A1 | 10/2006 |
| WO | WO 2007/015669 A2 | 2/2007 |
| WO | WO 2007/019957 A1 | 2/2007 |
| WO | WO 2007/141605 A2 | 12/2007 |
| WO | WO 2007/142589 A1 | 12/2007 |
| WO | WO 2008/004960 A2 | 1/2008 |
| WO | WO 2008/004960 A8 | 1/2008 |
| WO | WO 2008/017281 A1 | 2/2008 |
| WO | WO 2008/017301 A2 | 2/2008 |
| WO | WO 2008/017301 A3 | 2/2008 |
| WO | WO 2008/116623 A1 | 10/2008 |
| WO | WO 2009/013590 A2 | 1/2009 |
| WO | WO 2009/075998 A2 | 6/2009 |
| WO | WO 2009/116926 A1 | 9/2009 |
| WO | WO 2010/082171 A2 | 7/2010 |
| WO | WO 2010/087752 A1 | 8/2010 |
| WO | WO 2010/142671 A1 | 12/2010 |
| WO | WO 2011/038709 A1 | 4/2011 |
| WO | WO 2011/117179 A1 | 9/2011 |
| WO | WO 2011/127981 A1 | 10/2011 |
| WO | WO 2013/025165 A1 | 2/2013 |
| WO | WO 2013/041264 A1 | 3/2013 |
| WO | WO 2013/083290 A1 | 6/2013 |

OTHER PUBLICATIONS

U.S. Appl. No. 15/028,831, filed Apr. 12, 2016, Darko Pervan.
International Search Report issued in PCT/SE2012/050873, dated Dec. 14, 2012, Patent och-registreringsverket, Stockholm, SE, 7 pages.
Extended European Search Report issued in EP 12 82 4639.4, dated Apr. 29, 2016, European Patent Office, Munich, DE, 7 pages.
Laminate Flooring Tips (http://flooring.lifetips.corn/cat/61734/larninate-flooring-tips/index.html). Copyright 2000. 12 pages.
Pervan, Darko (Author), Technical Disclosure entitled "VA070 Strip Part," IP com No. IPCOM000210867D, Sep. 13, 2011, IP.com Prior Art Database, Accession No. AN XP013144908; 43 pages.
U.S. Appl. No. 15/901,614, Pervan.
Pervan, Darko, U.S. Appl. No. 15/901,614 entitled "Mechanical Locking System for Floor Panels," filed Feb. 21, 2018.

* cited by examiner

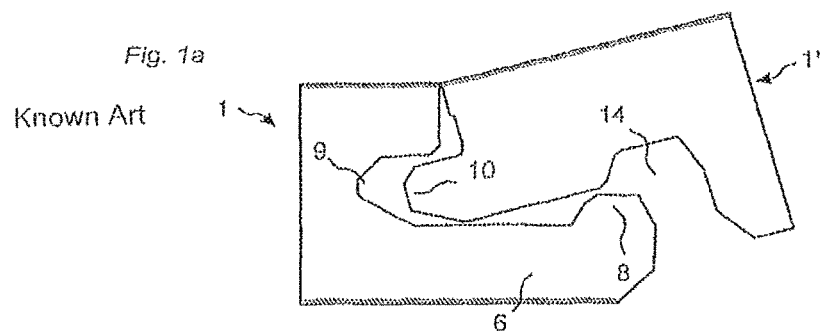
Fig. 1a Known Art
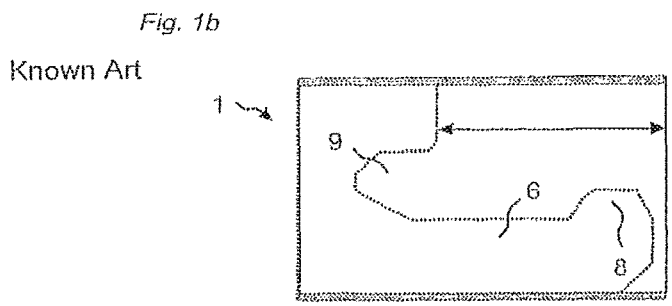
Fig. 1b Known Art
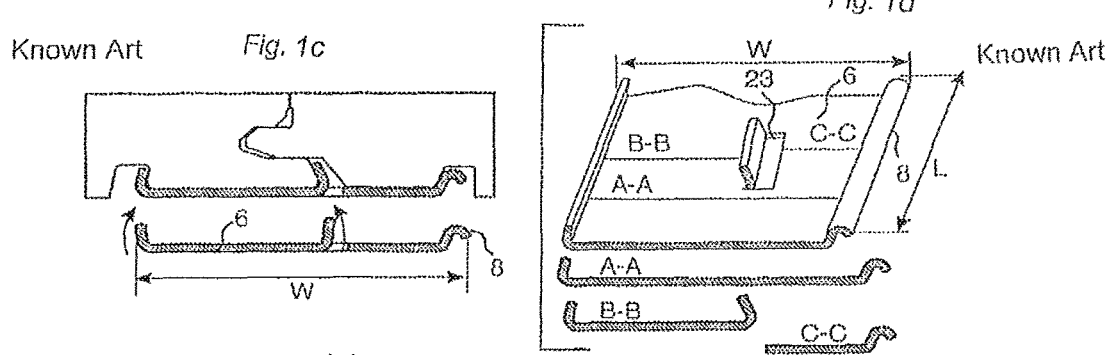
Known Art Fig. 1c
Fig. 1d Known Art
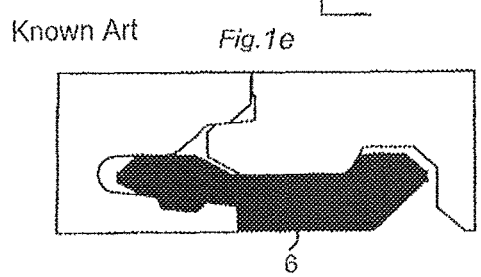
Known Art Fig. 1e Known Art Known Art Known Art

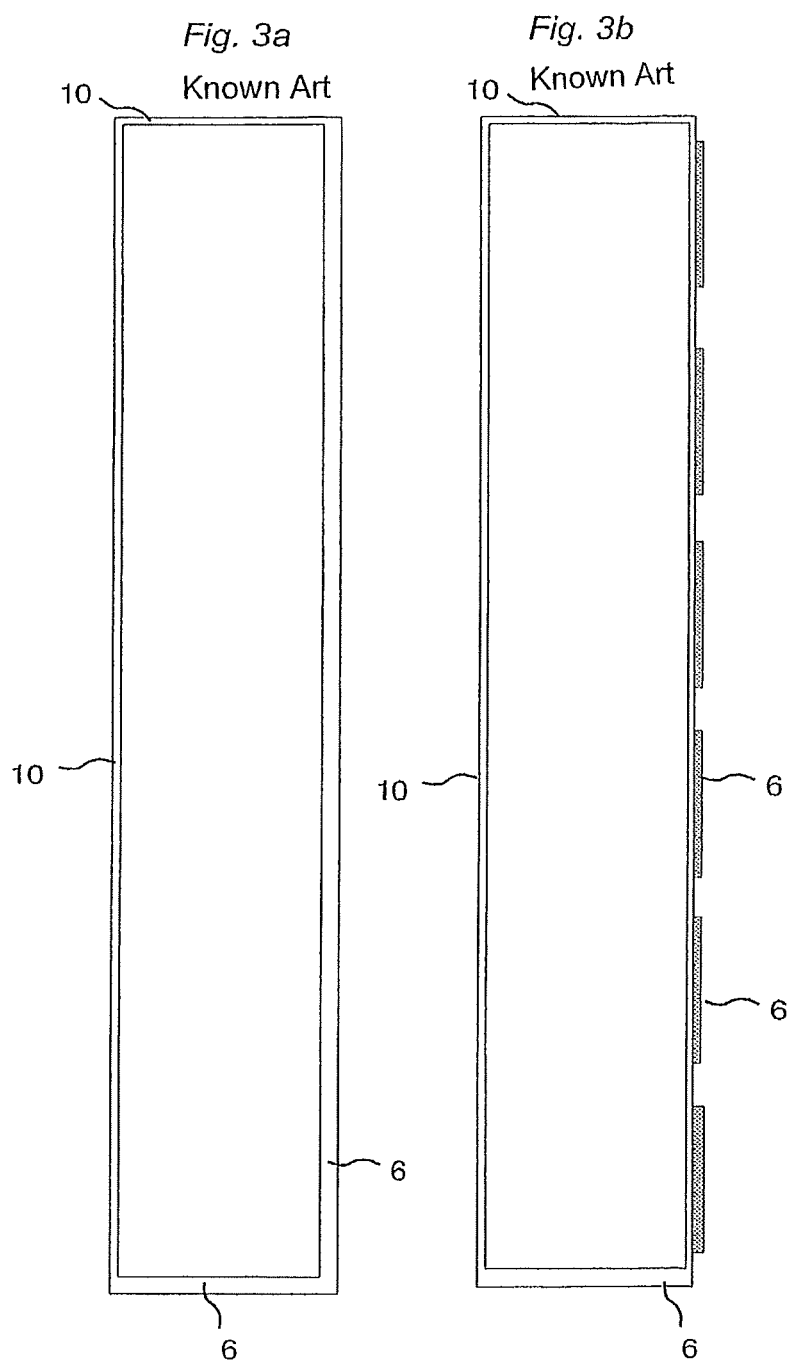

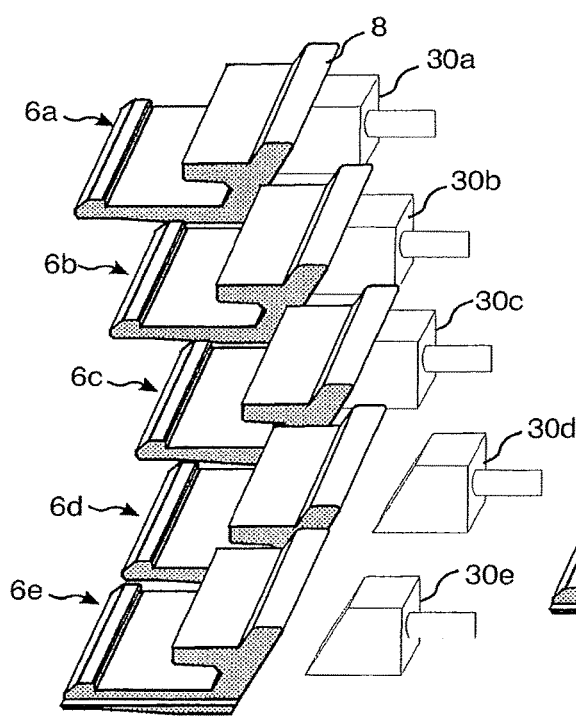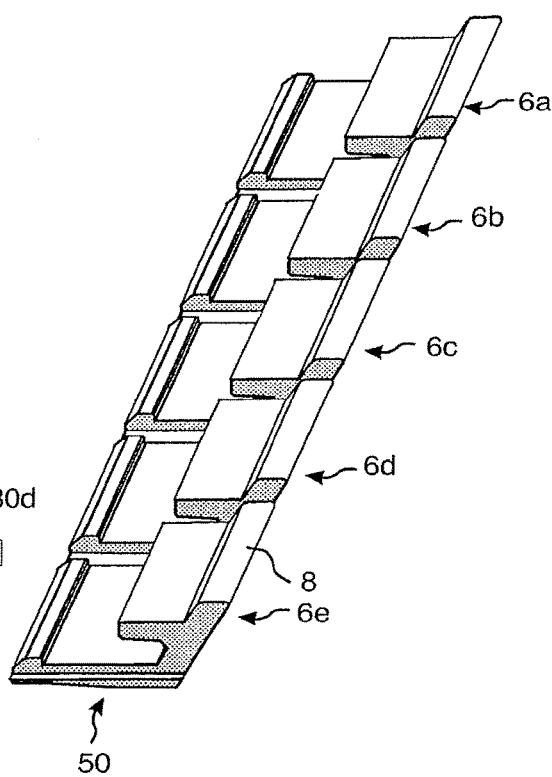
Fig. 6a
Fig. 6b

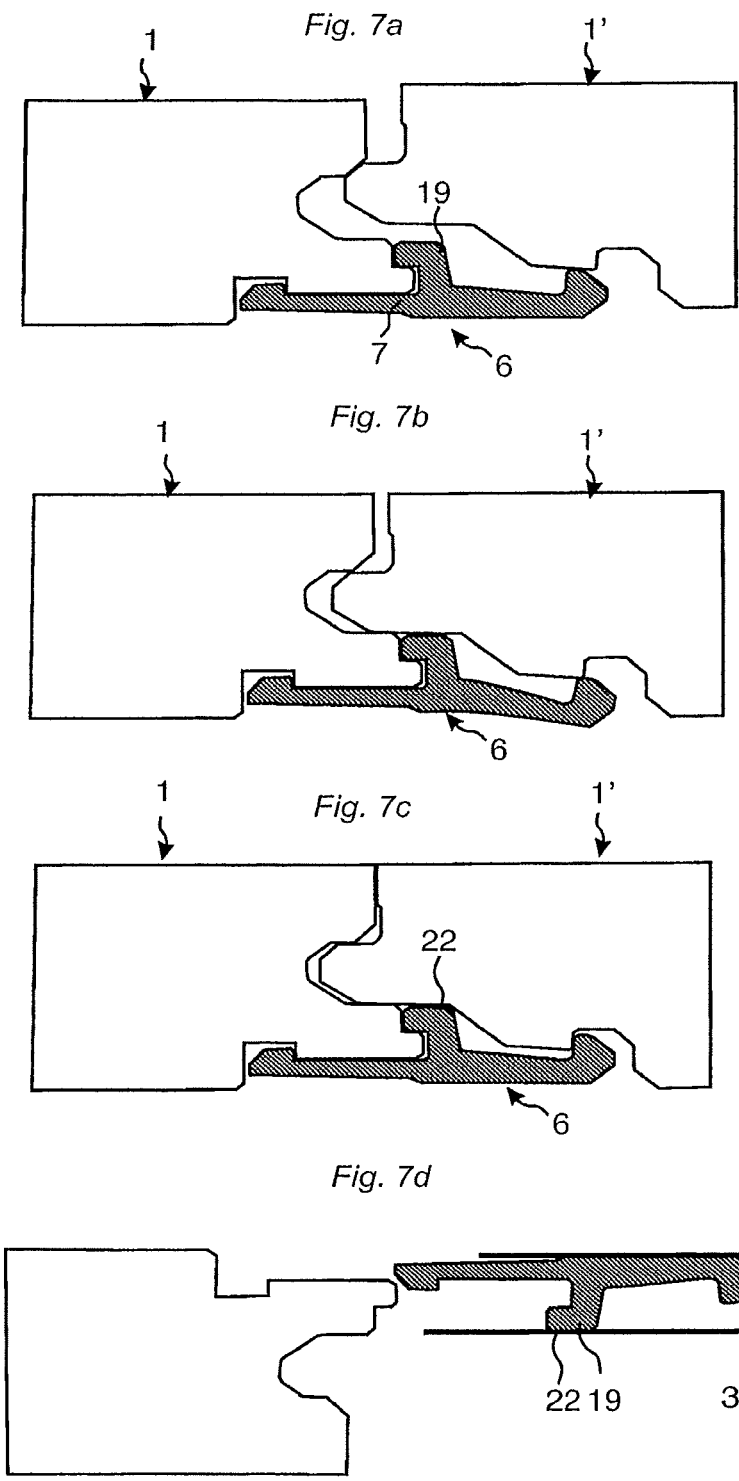

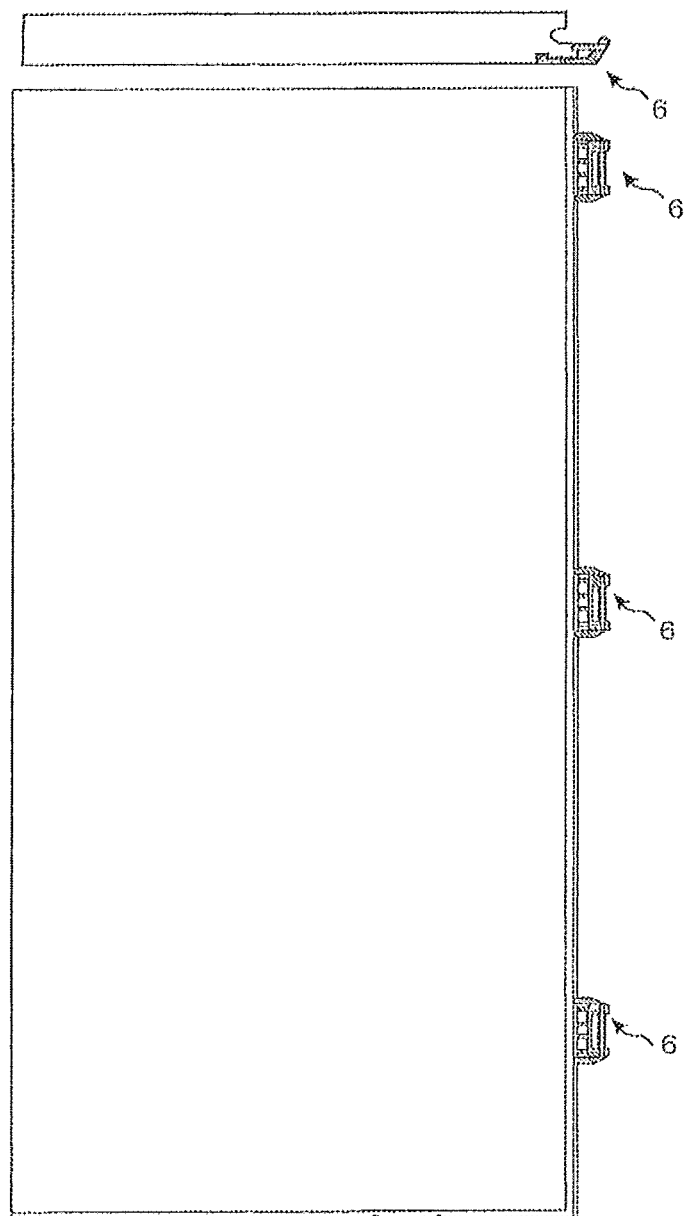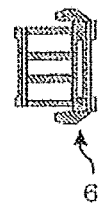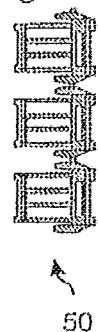

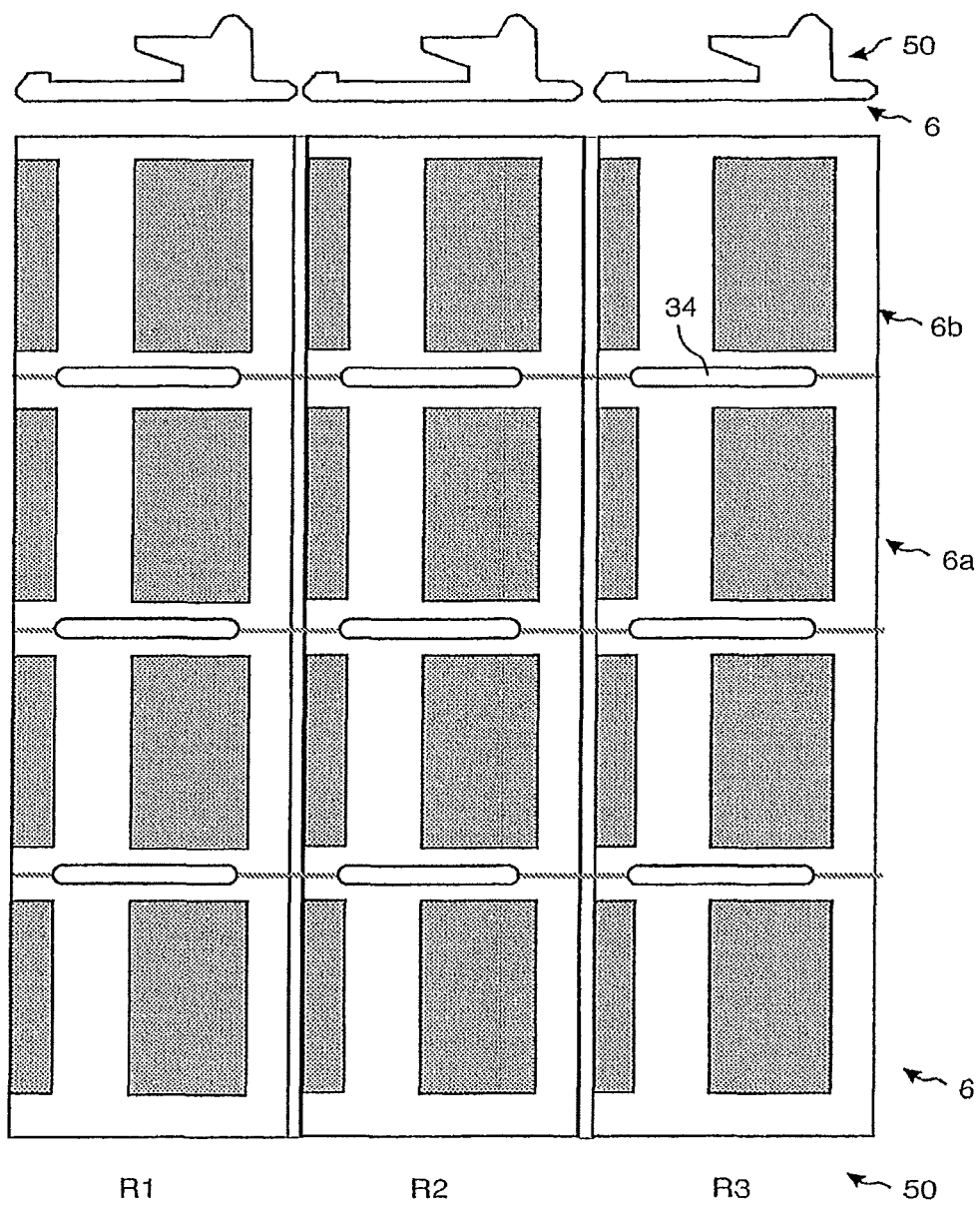

MECHANICAL LOCKING SYSTEM FOR FLOOR PANELS

CROSS REFERENCE TO RELATED APPLICATIONS

The present application is a continuation of U.S. application Ser. No. 14/988,262, filed on Jan. 5, 2016, which is a continuation of U.S. application Ser. No. 14/294,564, filed on Jun. 3, 2014, now U.S. Pat. No. 9,243,411, which is a continuation of U.S. application Ser. No. 13/585,485, filed on Aug. 14, 2012, now U.S. Pat. No. 8,763,340, which claims the benefit of U.S. Provisional Application No. 61/523,602, filed on Aug. 15, 2011. The entire contents of each of U.S. application Ser. No. 14/988,262, U.S. application Ser. No. 14/294,564, U.S. application Ser. No. 13/585,485 and U.S. Provisional Application No. 61/523,602 are hereby incorporated herein by reference in their entirety.

TECHNICAL FIELD

The disclosure generally relates to the field of mechanical locking systems for floor panels and building panels. The disclosure shows floorboards, locking systems and production methods.

FIELD OF APPLICATION

Embodiments of the present disclosure are particularly suitable for use in floating floors, which are formed of floor panels which are joined mechanically with a locking system integrated with the floor panel, i.e. mounted at the factory, are made up of one or more upper layers of wood or wood veneer, decorative laminate, powder based surfaces or decorative plastic material, an intermediate core of wood-fibre-based material or plastic material and preferably a lower balancing layer on the rear side of the core. Floor panels of solid wood or with a surface layer of cork, linoleum, rubber or soft wear layers, for instance needle felt glued to a board, printed and preferably also varnished surface and floors with hard surfaces such as stone, tile and similar materials are included. Embodiments of the disclosure can also be used for joining building panels which preferably contain a board material for instance wall panels, ceilings, furniture components and similar.

The following description of known technique, problems of known systems and objects and features of the disclosure will therefore, as a non-restrictive example, be aimed above all at this field of application and in particular at panels formed as rectangular floor panels with long and shorts edges intended to be mechanically joined to each other on both long and short edges.

The long and short edges are mainly, used to simplify the description of embodiments of the disclosure. The panels may be square. Embodiments, of the disclosure are preferably used on the long edges. It should be emphasized that embodiments of the disclosure can be used in any floor panel and it may be combined with all types of known locking system formed on the short edges, where the floor panels are intended to be joined using a mechanical locking system connecting the panels in the horizontal and/or vertical directions on at least two adjacent edges.

BACKGROUND

Laminate flooring usually comprise a core of a 6-12 mm fibre board, a 0.2-0.8 mm thick upper decorative surface layer of laminate and a 0.1-0.6 mm thick lower balancing layer of laminate, plastic, paper or like material. A laminate surface comprises melamine-impregnated paper. The most common core material is fibreboard with high density and good stability usually called HDF—High Density Fibreboard. Sometimes also MDF—Medium Density Fibreboard—is used as core.

Laminate floor panels of this type have been joined mechanically by means of so-called mechanical locking systems. These systems comprise locking means, which lock the panels horizontally and vertically. The mechanical locking systems are usually formed by machining of the core of the panel. Alternatively, parts of the locking system can be formed of a separate, material, for instance aluminium or HDF, which are integrated with the floor panel, i.e. joined with the floor panel in connection with the manufacture thereof.

The main advantages of floating floors with mechanical locking systems are that they are easy to install. They can also easily be taken up again and used once more at a different location.

DEFINITION OF SOME TERMS

In the following text, the visible surface of the installed floor panel is called "front side", while the opposite side of the floor panel, facing the sub floor, is called "rear side". The edge between the front and rear side is called "joint edge". By "horizontal plane" is meant a plane, which extends parallel to the outer part of the surface layer. Immediately juxtaposed upper parts of two adjacent joint edges of two joined floor panels together define a "vertical plane" perpendicular to the horizontal plane. By "vertical locking" is meant locking parallel to the vertical plane. By "horizontal locking" is meant locking parallel to the horizontal plane.

By "up" is meant towards the front side, by "down" towards the rear side, by "inwardly" mainly horizontally towards an inner and centre part of the panel and by "outwardly" mainly horizontally away from the centre part of the panel.

RELATED ART AND PROBLEMS THEREOF

For mechanical joining of long edges as well as short edges in the vertical and horizontal direction perpendicular to the edges several methods may be used. One of the most used methods is the angle-snap method. The long edges are installed by angling. The panel is then displaced in locked position along the long side. The short edges are locked by horizontal snapping. The vertical connection is generally a tongue and a groove. During the horizontal displacement, a strip with a locking element is bent and when the edges are in contact, the strip springs back and a locking element enters a locking groove and locks the panels horizontally. Such a snap connection is complicated since a hammer and a tapping block has to be used to overcome the friction between the long edges and to bend the strip during the snapping action.

Similar locking systems may also be produced with a rigid strip and they are connected with an angling-angling method where both short and long edges are angled into a locked position.

It is known that a locking strip may be formed of a separate material such as aluminium or HDF and that such strip may be clamped in undercut grooves or attached into a horizontally extending groove formed at an edge of a panel by snapping and/or turning. Such systems are described in WO 94/26999 and WO 03/083234 (Välinge Innovation AB). It is also known that several strip parts spaced form each other may be attached to along side edge in order to obtain further cost savings.

FIGS. 1a and 1b show a known locking system that is locked with angling. The horizontal locking is obtained by a locking strip 6 with a locking element 8 formed at one panel edge 1 that locks into a locking groove 14 formed in another adjacent panel edge 1'. The forming of the strip 6 creates a waste as shown in FIG. 1b.

FIGS. 1c and 1d show a known locking system with a separate aluminium strip 6 attached to a lower part of a panel edge. A part of the strip 6 is bent around inwardly inclined vertically extending surfaces. Such connection of the strip 6 to the panel edge is made in a separate operation than the machining of the edge. The strip comprises three different cross section A-A, B-B and C-C. Each cross section comprises the same material thickness since the strip is formed from a 0.6 mm aluminium sheet. The length L of the strip is the same along the width W. The part of the strip, that extends from the edge comprises a small cavity 23, which is formed when a part of the strip body is punched and bent around a panel edge.

FIG. 1e shows a strip 6, which is attached with snapping into a horizontally extending groove. This strip is formed by machining and has the same cross section along its length.

Such locking systems suffer from several disadvantages. The material content is high due to the design and only limited material savings may be reached. This fixing of the strip to the edge is rather complicated and slow.

FIG. 2a-2c show a locking system with a separate displaceable tongue 10a inserted in a horizontally extending displacement groove 10b formed on the short edge of a panel. The separate tongue is inserted in high speed and is mainly used to obtain higher flexibility when the panels are locked with a vertical snapping. The short side production speed is however considerably lower than the long side production speed and conventional inserting methods that are used to insert flexible tongues are not suitable to be used at long edges to insert several strips one after each other.

FIG. 3a shows a conventional panel with a strip 6 that extends along the whole long edge. Material savings may be increased if several strip parts 6 are connected on a long side of a panel as shown in FIG. 3b.

Wood and laminate panels are produced with a production speed on long edges of 1-5 m/sec. This means that 5-25 strip parts must be inserted each second if, for example, five strip parts per meter are attached, at an edge. Known separate strips and fixing methods are not adapted to such high-speed production and separate strip parts are not able to compete with the conventional machining where the strip is machined in one piece with the panel edge.

It would be a major advantage if separate strip parts that comprise less material and that may be inserted in high speed could be used to replace the machined strip especially in a long edge locking system.

SUMMARY AND OBJECTS

An overall objective of embodiments of the present disclosure is to provide an improved and more cost efficient locking system for primarily rectangular floor panels with long and short edges installed in parallel rows, which allows that the edges may be locked to each with angling, and/or horizontal snapping and/or vertical snapping.

Another specific objective is to provide production method that allows an efficient high-speed connection of several strip parts into an edge of a floor panel.

The above objects of embodiments of the disclosure may be achieved wholly or partly by locking systems and floor panels according to the disclosure. Embodiments of the disclosure are evident from the description and drawings.

A first aspect of the disclosure is building panels provided with a locking system for vertical, and horizontal locking of a first edge of a first panel and a second edge of a second adjacent panel. The locking system comprises a tongue and a tongue groove for vertical locking and strip parts attached to the first edge for horizontal locking. Each strip part comprises an upwardly extending locking element configured to cooperate with a downwardly open locking groove formed at the second edge. The strip part comprises a strip body with an inner part that extends inwardly from the first edge and at a rear side of the first panel and an outer part that extends outwardly from said first edge. The inner strip part comprises a fixing element that cooperates with a downwardly open fixing groove, formed in the rear, side of the first panel, and locks the strip part to the first edge in a first horizontal direction. The strip part comprises a locking protrusion, located above the strip body, that locks the strip to the first edge vertically and in a second horizontal direction against a holding protrusion formed at the first edge. The strip part is configured to be attached to the first edge with an essentially horizontal snapping action. The strip part comprises upper and lower guiding surfaces that are essentially parallel with the strip part body.

The strip part may comprise a locking protrusion that protrudes horizontally from the locking element.

The locking protrusion may comprise a sliding surface that during locking is in contact with the adjacent edge.

The locking protrusion may be spaced vertically from the strip body.

The strip body may comprise a cavity in the inner part.

The length of the strip part may vary along its width.

The fixing element may comprise a flexible locking part that locks against a wall of the fixing groove.

A second aspect of the disclosure is a strip blank comprising several strip parts configured to lock panels horizontally and to be fixed to a panel edge by essentially horizontal snapping. The strip blank comprises at least two strip parts located side by side in at least two parallel rows.

A third aspect of the disclosure is a method to fix several strip parts to an edge of a panel. Each strip part comprises a strip body that extends inwardly from the edge at the rear side of the panel and is configure to lock two adjacent panels horizontally and to be fixed to a panel edge by essentially horizontal snapping. The method comprises the steps of:

separating strip parts from a strip blank that comprises at least two strip parts located side by side in at least two parallel rows;

displacing the strip parts essentially vertically in front of several hammers;

pressing and snapping the strip parts by the hammers to a panel edge by an essentially horizontal displacement; and activating the hammers one after each other when the panel is displaced horizontally in relation to the hammers.

A fourth aspect of the disclosure is building panels provided with a locking system for vertical and horizontal locking of a first edge of a first panel and a second edge of a second adjacent panel. The locking system comprises a tongue and a tongue groove for vertical locking and strip parts attached to the first edge for horizontal locking. Each strip part comprises an upwardly extending locking element configured to cooperate with a downwardly open locking groove formed at the second edge. The strip part comprises a strip body with an inner part that extends inwardly from the first edge and at a rear side of the first panel and an outer part that extends outwardly from said first edge. The inner part comprises a fixing element that cooperates with a downwardly open fixing groove formed on the rear side of the first panel and that locks the strip part to the first edge in a horizontal direction. The strip part comprises a locking protrusion, located above the strip body that locks the strip part to the first edge vertically against a holding protrusion formed at the first edge. The strip part comprises polymer material and is formed by injection moulding.

The inner part may comprise several cavities.

The outer part may comprise a cavity.

The cavity may comprise a wall with a wall thickness, which is smaller than the width of the cavity.

The length of the strip part may vary along its width.

The fixing element may comprise a flexible locking part that locks against a wall of the fixing groove.

The building panel may be a floor panel.

A fifth aspect of the disclosure is a strip part, configured to lock panels horizontally and to be fixed to a panel edge. The strip part comprises a strip body with an inner part configured to be fixed under the panel edge and an outer part configured to extend outside the panel edge. The inner part comprises a fixing element configured to lock the strip part to the panel edge in a horizontal direction. The outer part comprises a locking protrusion, located above the strip body and configured to lock the strip part to the panel edge vertically, and a locking element configured to lock the panels in a horizontal direction. The inner part comprises a cavity formed in the strip body and located between the fixing element and the locking protrusion.

The fixing element may comprise a flexible locking part that prevents the strip part to be released from the panel edge by angling.

The flexible locking part may comprise a flexible protrusion extending along the fixing element.

BRIEF DESCRIPTION OF THE DRAWINGS

The disclosure will in the following be described in connection to exemplary embodiments and in greater detail with reference to the appended exemplary drawings, wherein:

FIGS. 1a-1e illustrate locking systems according to known technology.

FIGS. 3a-3b illustrate floorboards with locking systems according to known technology.

FIGS. 6a-6b illustrate an inserting method according to an embodiment of the disclosure.

FIGS. 7a-7d illustrate locking by horizontal snapping according to an embodiment of the disclosure.

FIGS. 14a-14d illustrate a panel with strip parts according to an embodiment of the disclosure.

FIGS. 17a-17b illustrates a strip blank according to an embodiment of the disclosure.

DETAILED DESCRIPTION THE EMBODIMENTS

To facilitate understanding, several locking systems in the figures are shown schematically. It should be emphasized that improved or different functions can be achieved using combinations of the embodiments.

All embodiments may be used separately or in combinations. Angles, dimensions, rounded parts, spaces between surfaces etc. are only examples and may be adjusted within the basic principles of the disclosure.

Figure 2A:
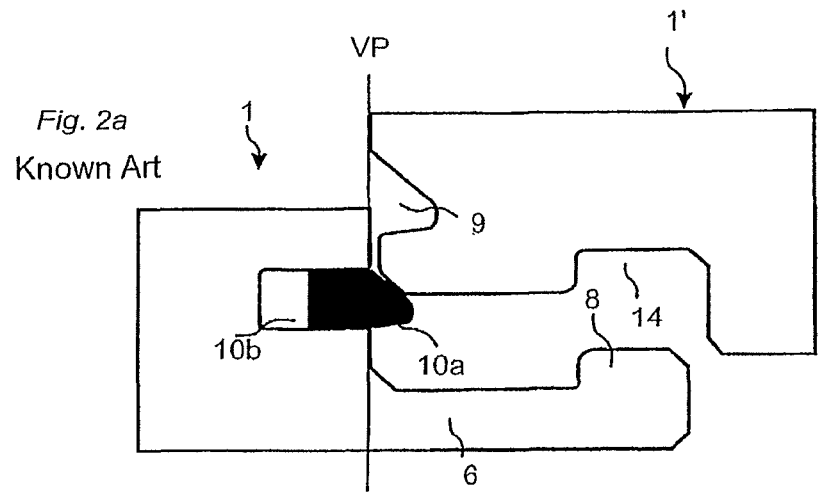
FIGS. 2a-2c illustrate a flexible and displaceable tongue according to known technology.
Figure 2B:
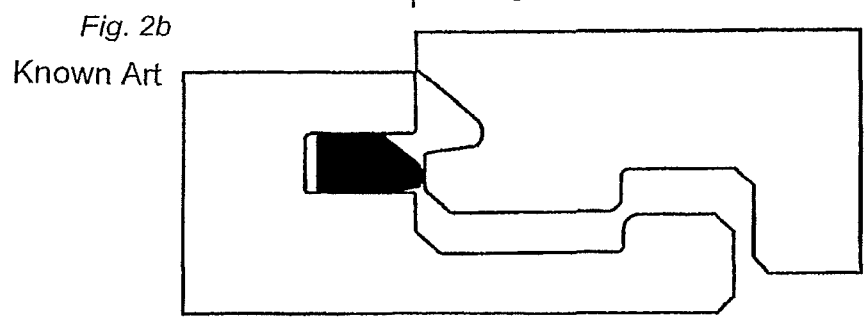
Figure 2C:
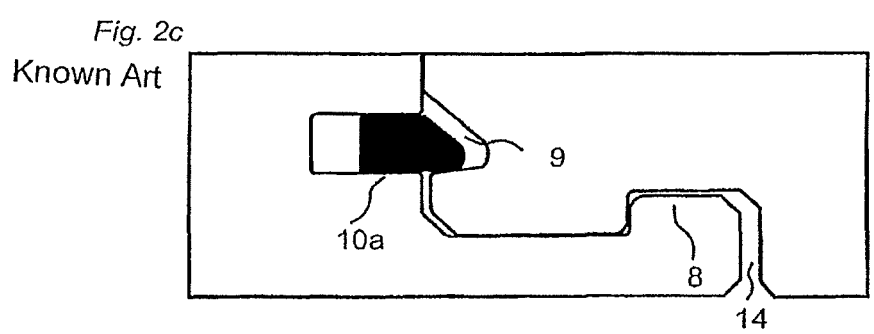
Figure 4A:
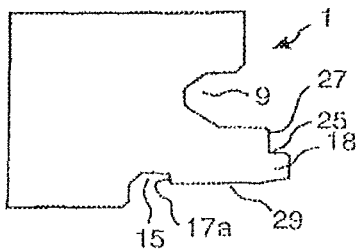
FIGS. 4a-4g illustrate a locking system according to an embodiment of the disclosure.
Figure 4B:
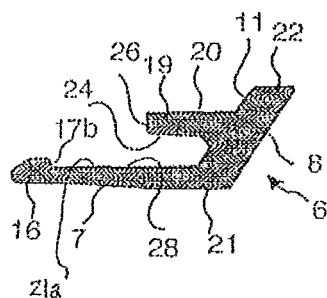
Figure 4C:
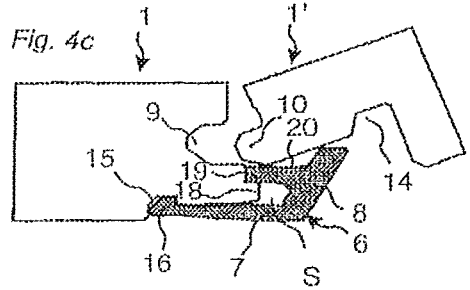
Figure 4D:
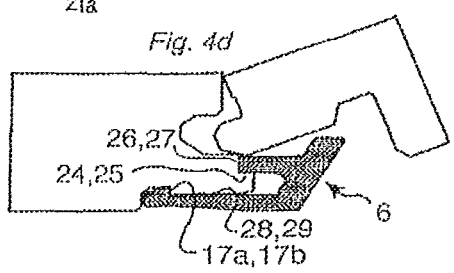
Figure 4E:
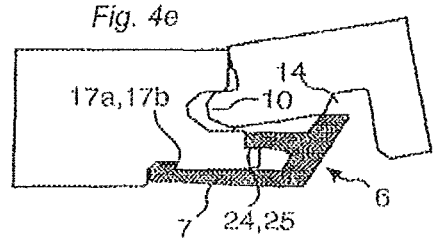
Figure 4F:
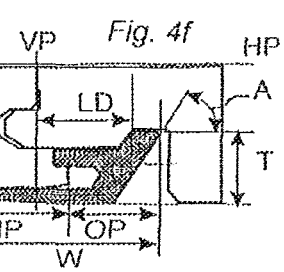
Figure 4G:
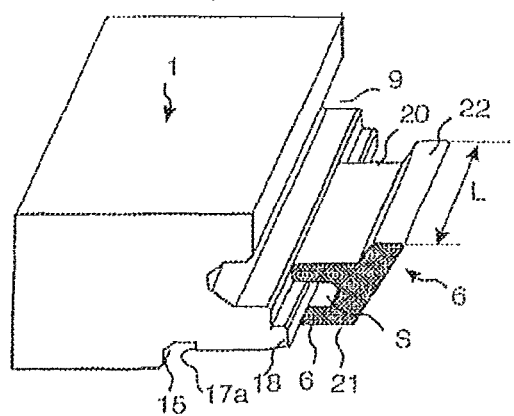

FIGS. 4a-4g show a locking system according to embodiments of the disclosure that may be connected with angling. FIGS. 4a and 4b show a strip part 6 comprising a strip body 7 with a fixing element 16 at an outer part, an upwardly extending locking element 8 at an opposite and outer part of the strip body and a locking protrusion 19 that preferably extends essentially horizontally towards the fixing element. The upper part of the locking element 8 comprises an upper guiding surface 22 and the strip body 7 comprises a lower guiding surface 21a that facilitates the fixation of the strip 6 to an edge of a first panel 1' as shown in FIGS. 5a-5e. The locking protrusion 19 comprises a sliding surface 20 that facilitates the insertion of a tongue 10 into a tongue groove 9 during angling as shown in FIGS. 4c and 4d. The panel edge comprises a fixing groove 15 that is open towards the rear side of the panel and a holding protrusion 18 extending from a lower part of the panel edge. The fixing element 16 is locked into the fixing groove 15 wherein essentially vertical locking surfaces 17a and 17b grip behind each other such that the strip is locked horizontally to the panel edge. The locking protrusion 19 is locked to the holding protrusion 18 vertically wherein a lower horizontal locking surface 24 on the locking protrusion 19 overlaps an upper horizontal locking surface 25 formed on the holding protrusion 18. The locking protrusion 19 comprises preferably a strip locking surface 26 that cooperated with an edge locking surface 27 formed on the panel edge and locks the strip part 6 horizontally. The strip part is locked horizontally by the active locking surfaces comprising the strip and the edge locking surfaces 26,27 and the cooperating fixing surfaces 17a, 17b. The strip part 6 is locked vertically by lower and upper horizontal locking surfaces 24,25 and by the upper part of the strip body 28 and the lower part of the edge 29 as shown in FIGS. 4c and 4d. The locking element may have a locking angle A of preferably about 40-90 degrees against a horizontal plane. A high locking angle A gives a strong locking but requires a larger locking distance LD which is the distance from the vertical plane VP, where the upper edges are in contact, and to the upper part of the locking surface 11 of the locking element 8. The strip part comprises an inner part IP that extends inwardly from the edge at a rear side of the panel edge and an outer part OP that extends from the edge. The strip has a length direction L along the joint, a width W direction in a horizontal direction perpendicular to the length and a thickness direction T vertically and perpendicularly to the width W, as shown in FIGS. 4e, 4f, and 4g. The thickness of the strip body 7 varies along the width and this facilitates the connection of the strip 6 to the edge. The thickness of the locking protrusion may also vary. Preferably there is a space S between the holding and locking protrusions 18,19, the strip body 7 and the locking element 8 as shown in FIGS. 4c and 4d. Such a space S may be used to increase the flexibility of the strip and to facilitate the connection of the strip to the edge.

Figure 5A:
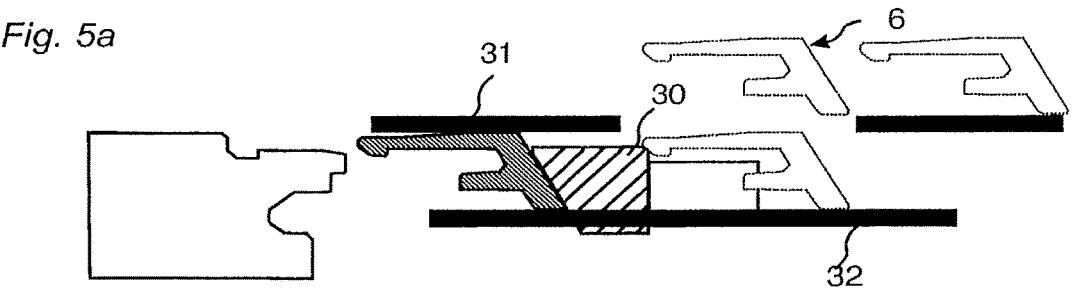
FIGS. 5a-5f illustrate a method to fix the strip to an edge according to an embodiment of the disclosure.
Figure 5B:
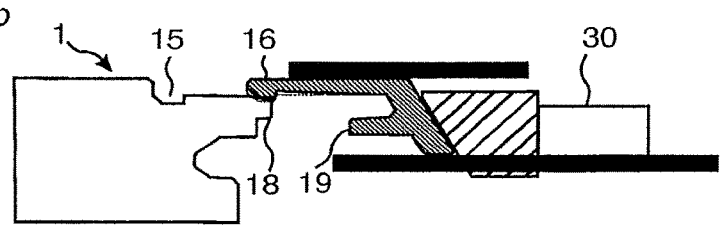
Figure 5C:
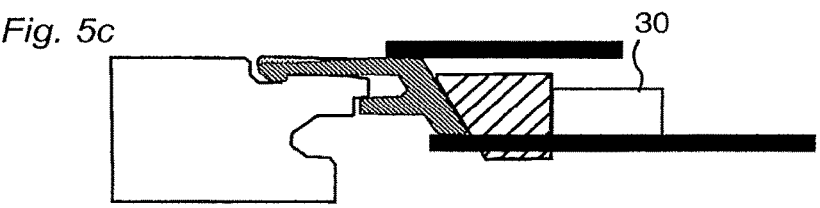
Figure 5D:
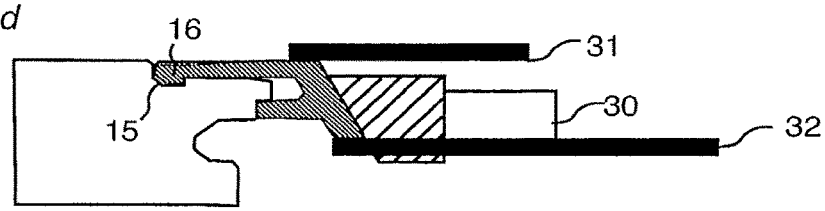
Figure 5E:
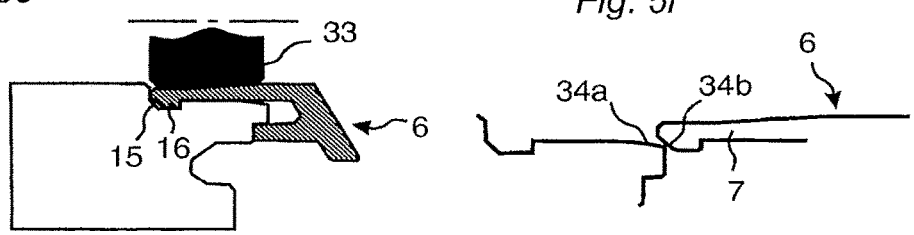
Figure 5F:
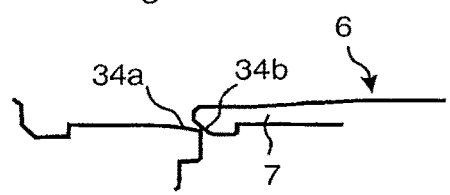

FIGS. 5a-5e show a method to fix a strip part 6, as described in FIGS. 4a-4g, to an edge a panel. The panel 1 is during machining of the edges positioned with the surface pointing downwards. It is preferred that the strip part is fixed to the panel in the same machining equipment that forms the edge by rotating tools. This puts special requirement on the inserting method, especially if several strip parts are to be fixed in high speed to a long side edge of a panel. The strip parts are preferably separated from a strip part blank, comprising several strip parts, and displaced vertically to the same level as the panel edge as shown in FIG. 5a. The strip parts are guided by upper 31 and lower 32 guiding rails and pushed by a hammer 30 towards the edge of the pane 1. The strip is connected to the edge with an essentially horizontal snapping action whereby the fixing element 16 enters partly or completely into the fixing groove 15 and the locking protrusion 19 overlaps the holding protrusion 18. Such a connection may be accomplished in high speed and accuracy due to the flexibility of the strip parts and the precise guidance of the guiding rails. The strip part 6 is after connection displaced laterally in the direction of the long edges by the panel that is displaced relative the fixing equipment. A final connection of the fixing element 16 into the fixing groove 15 is preferably made with a wheel 33 that presses the fixing element 16 into the fixing groove 15 as shown in FIG. 5e. The firing element 16 may press against two opposite walls of the fixing groove 15 as shown in FIGS. 5d and 5e. FIG. 5f shows that bevels or rounded sections 34a, 34b may be formed on the outer part of the strip part and/or the panel edge in order to facilitate snapping. The strip body 7 may also be thinner at an outer portion than at an inner portion in order to facilitate snapping and to save material. Bevels or rounded sections may also be formed on the outer parts of the holding and locking protrusions 18,19. The horizontal lacking surfaces may be essentially horizontal or inclined.

FIGS. 6a and 6b show a method that may be used to increase the production speed such that it may be possible to insert up to 30 strip parts per second and more. The strip parts are in these figures shown with the locking element 8 pointing upwards. The strip parts 6 are produced in strip blanks 50 comprising several strip parts attached to each other in parallel rows. Each row may comprise, for example, 5-10 strip parts 6a-6e or more as shown in FIG. 6b. The strips are separated and moved to a position, preferably vertically, in front of several hammers 30a-30e that preferably are located behind each strip in the row. The whole strip part row is inserted by the hammers that push the strip parts one after each other towards the panel edge. The spacing between the strips parts attached to an edge is obtained by the time difference that the hammer action is activated by a computer system.

FIGS. 7a-7d show that the strip part 6 may be used in locking systems that are locked with horizontal snapping where a part of the strip is bent during snapping. The locking protrusion 19 is in this embodiment connected to the strip body 7. A part of the locking protrusion 19 comprises a guiding surface 22 as shown in FIG. 7d.

Figure 8A:
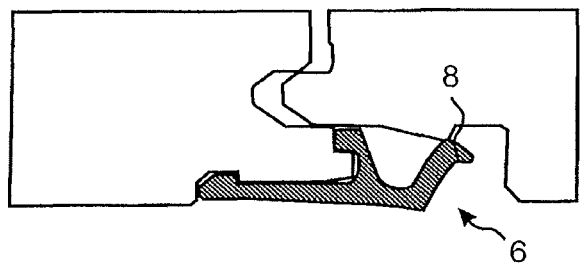
FIGS. 8a-8e illustrate locking by horizontal and vertical displacement according to an embodiment of the disclosure.
Figure 8B:
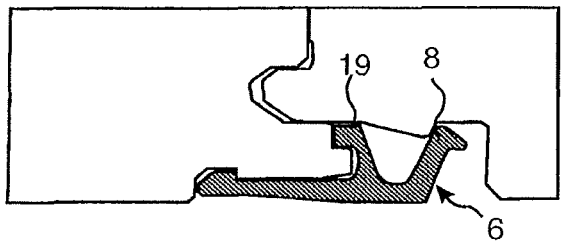

FIGS. 8a-8b shows that horizontal snapping may be obtained by a locking element 8 that is flexible and bends during locking.

Figure 8C:
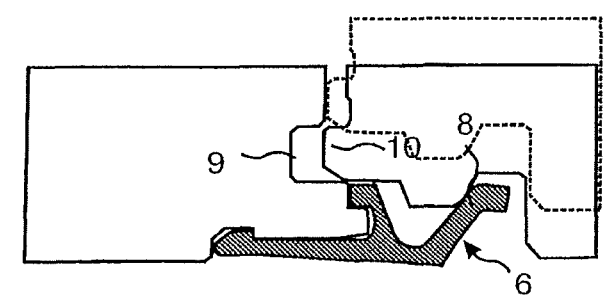
Figure 8D:
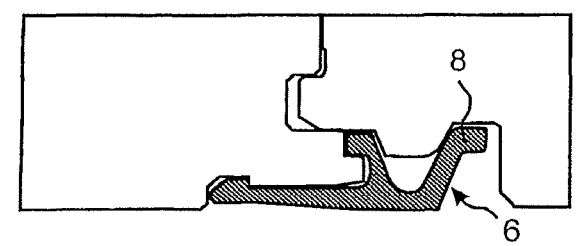

FIGS. 8c-8d shows that the locking system may be locked by vertical displacement. The locking is accomplished by a flexible locking element 8 that bends during the vertical displacement of the panel edges.

Figure 8E:
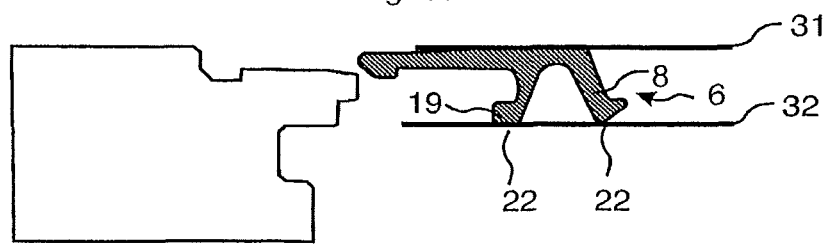
Figure 9A:
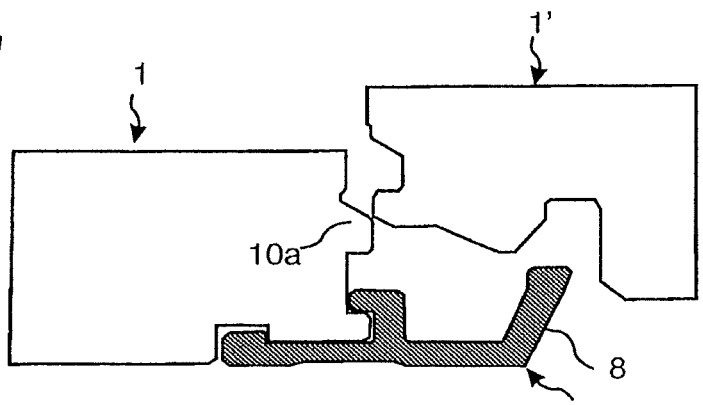
FIGS. 9a-9d illustrate embodiments of the disclosure.
Figure 9B:
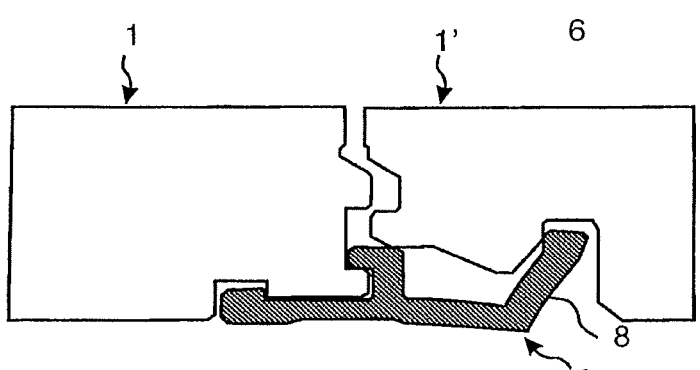
Figure 9C:
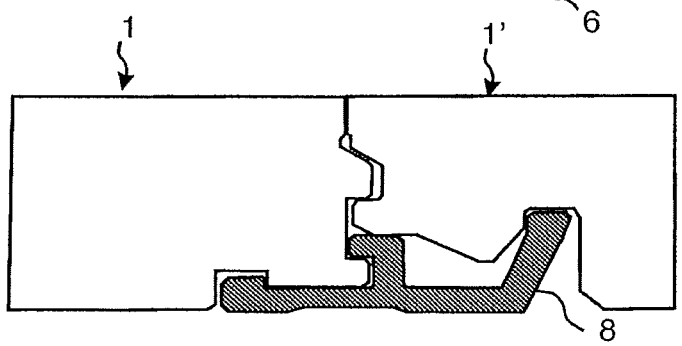
Figure 9D:
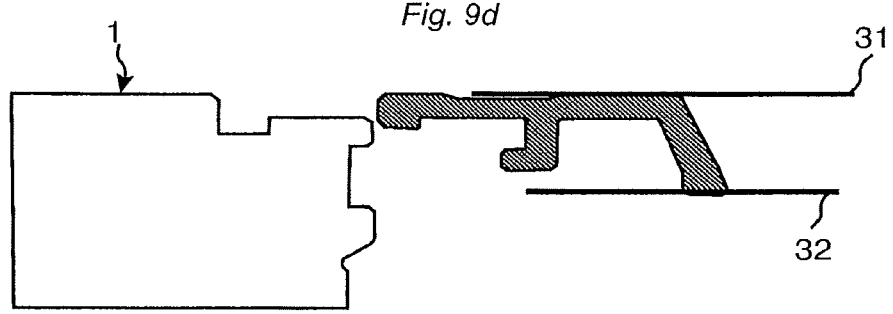
Figure 10A:
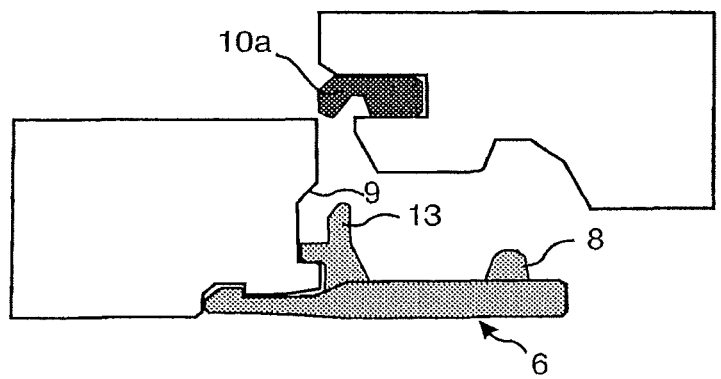
FIGS. 10a-10d illustrate vertical snapping with a separate tongue according to an embodiment of the disclosure.
Figure 10B:
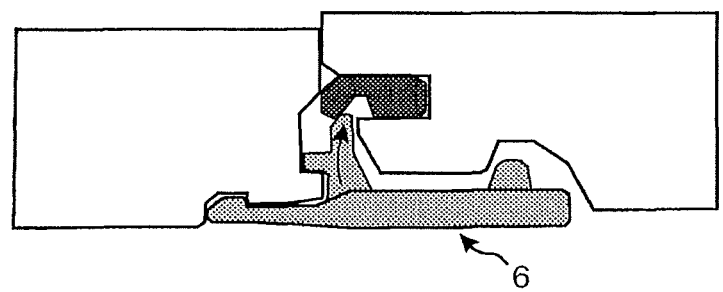
Figure 10C:
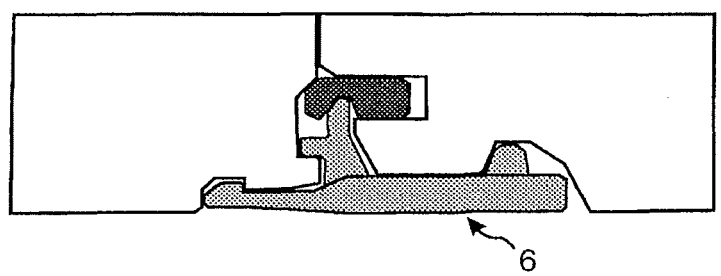
Figure 10D:
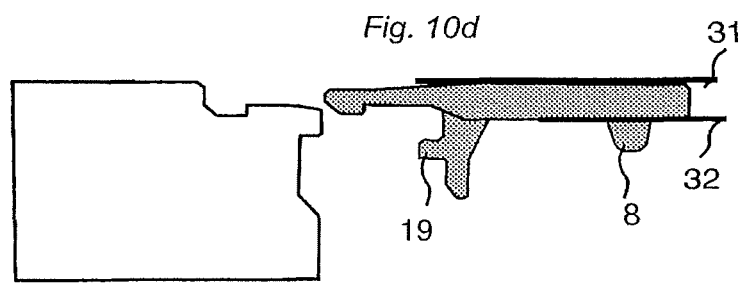

FIG. 8e shows that a part the locking element 8 and the locking protrusion 19 may comprise guiding surfaces 22.

FIGS. 9a-9d show that a tongue 10a may be formed on the first panel 1 comprising the strip part 6 and this may be used to facilitate, for example, a connection with vertical displacement.

FIGS. 10a-10d show that the strip part 6 may comprise a pulling extension 13 that pulls a displaceable tongue 10a into a tongue groove 9 during vertical displacement of the panels. The strip part 6 is made of several cross sections which allowed that guiding rails may be located on each side of a locking element 8 and a locking protrusion 19.

Figure 11A:
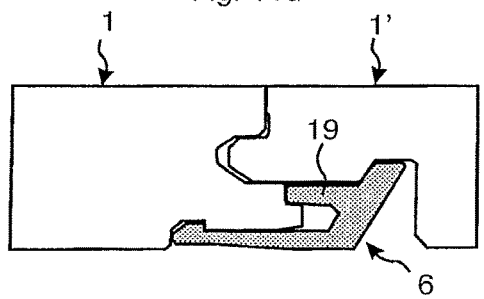
FIGS. 11a-11h illustrate embodiments of the disclosure.
Figure 11B:
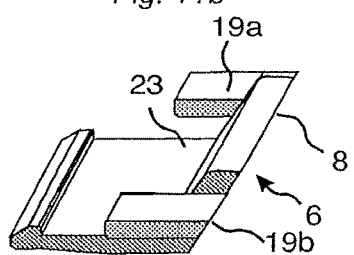
Figure 11C:
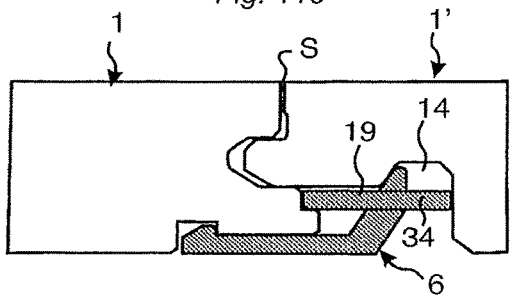
Figure 11D:
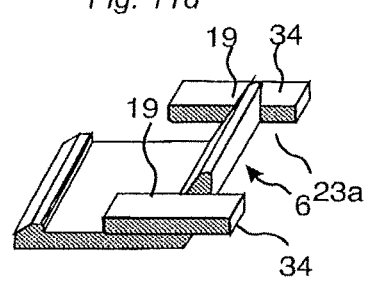
Figure 11E:
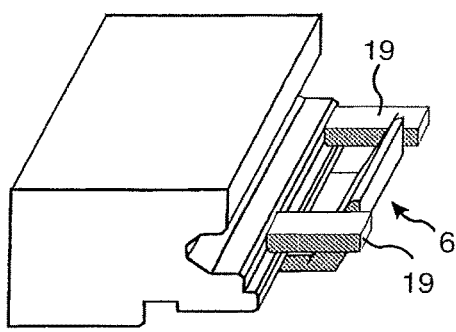
Figure 11F:
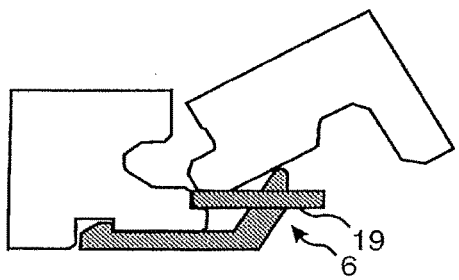
Figure 11G:
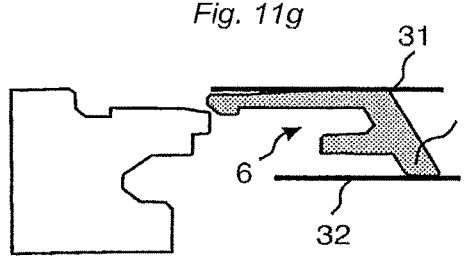
Figure 11H:
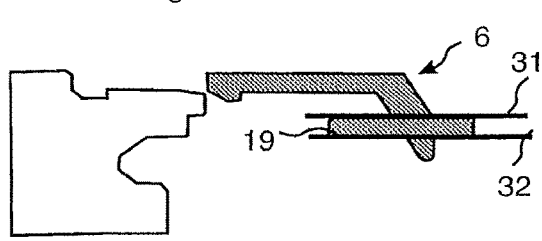

FIGS. 11a-11h show a strip part 6 that is formed by injection moulding. This production method makes it possible to form advanced three dimensional strip parts, which are optimized to save material. The locking protrusion 19 is formed as two parts 19a, 19b that are spaced from each other by a cavity 23. The locking protrusions are connected to the edges of the locking element 8 as shown in FIG. 11b. FIGS. 11c and 11d show that such locking protrusions may comprise a locking extension 34 that extends horizontally on each side of the locking element 8 such that a cavity 23a is formed between the extensions. Such extension may comprise guiding surfaces 31,32 and may be used to guide the strip part with high precession during production when the strip part is fixed to the edge as shown in FIG. 11h.

FIG. 11e shows a three-dimensional view of a first panel 1 provided with a strip part 6.

FIG. 11f illustrates assembling a first panel 1 with a second adjacent panel.

FIG. 11c shows that the locking extension 34 or any other part of the strip may be in contact with an inner wall of the locking groove 14 and that the panels 1, 1' are locked with a small space S between the upper edges. Such locking system may be used in, for example, floors that are glued down to the sub floor and where a small space gives room for swelling of the edges such that the so called "topping" of the edges may be avoided. The strip parts may be used to position floor panels that are glue down and to keep the floor panels in correct position until the glue cures. Only a few strip parts with rather low material content are needed to facilitate glue down installation.

FIGS. 12a-12f show that considerable material reductions may be reach with a strip part 6 that is three-dimensional and comprises several cavities 23a-23e. The strip part is preferably formed by injection moulding of a polymer material that preferably comprises glass fibres. Cavities may be formed in the strip body 23a, in the locking protrusion 23b, in the locking extension 23c, in the locking element 23d and in the fixing element 23e. The strip part 6 and the cavities have a length L in a direction along the panel edge, a width W perpendicular to the edge and a thickness T in the vertical direction. The length L of the strip part may vary along the width W, the width W may vary along the length L and the thickness may vary along the length L.

Figure 12A:
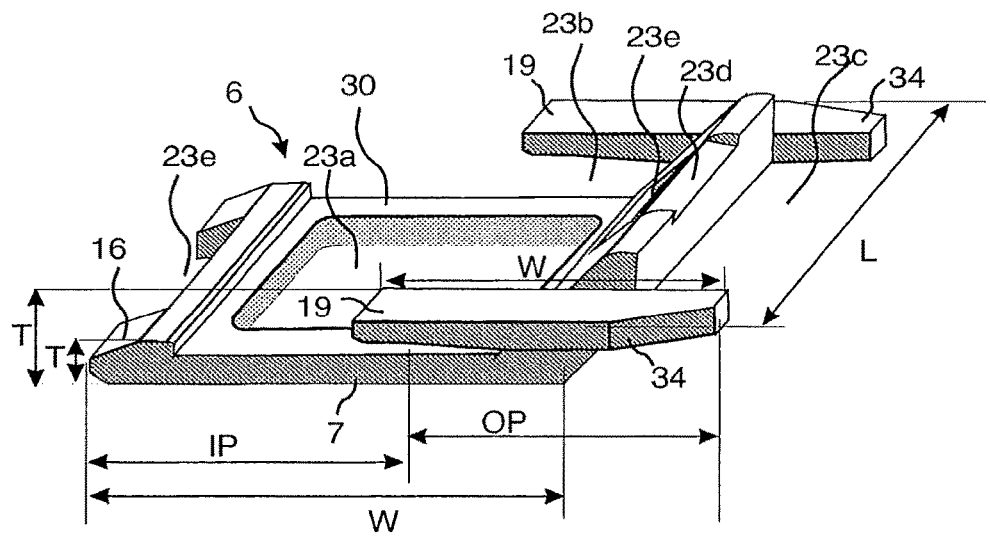
FIGS. 12a-12f illustrate methods according to embodiments of the disclosure to reduce material content in injection moulded spring parts.
Figure 12B:
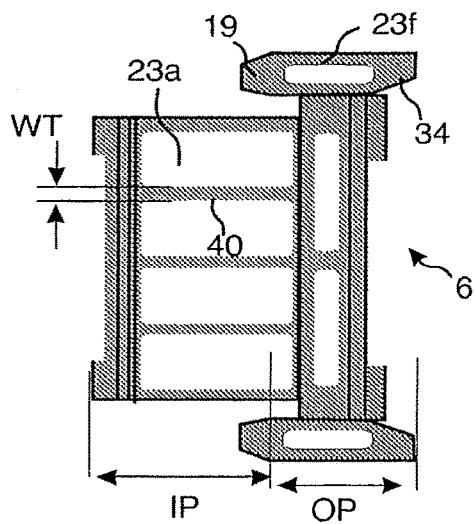

FIGS. 12b-12f show alternative embodiments of a three-dimensional strip part 6. The strip part may have several cavities 23a, 23f formed in the strip body and/or in the locking protrusion 19 as shown in FIG. 12b. A cavity 23 has preferably a wall 40 with a wall thickness WT that is smaller than the width of the cavity. Such three dimensional forms will provide considerable cost savings.

Figure 12C:
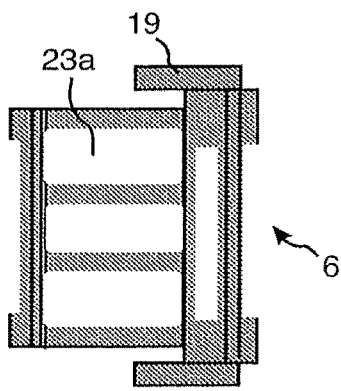
Figure 12D:
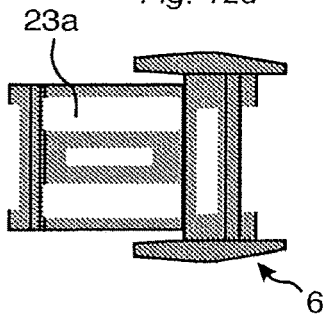
Figure 12E:
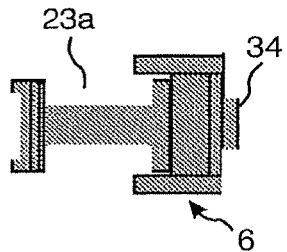
Figure 12F:
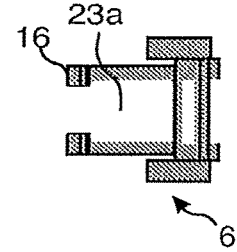

FIG. 12c shows a strip part without a locking extension 34. FIG. 12d-12f shows that the cavities may have different forms and that the fixing element 16 may be discontinuous. FIG. 12e show a locking extension 34 that extends from a middle part of the locking element and that may be used as guiding according to the principle shown in FIG. 13c.

FIGS. 13a-13f show a production method to fix a strip part 6 to a panel edge. The strip parts comprise locking extensions 34 that are used to guide the strip part during production when the strip part is fixed to the edge of the panel. It is preferred that strip parts are factory connected but they may of course be connected to a panel during installation.

Figure 13A:
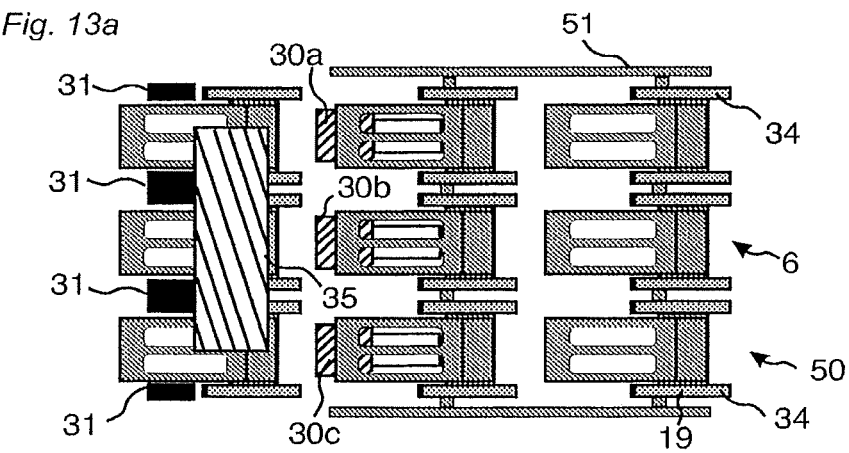
FIGS. 13a-13f illustrate fixing of a strip according to an embodiment of the disclosure that comprises a locking extension
Figure 13B:
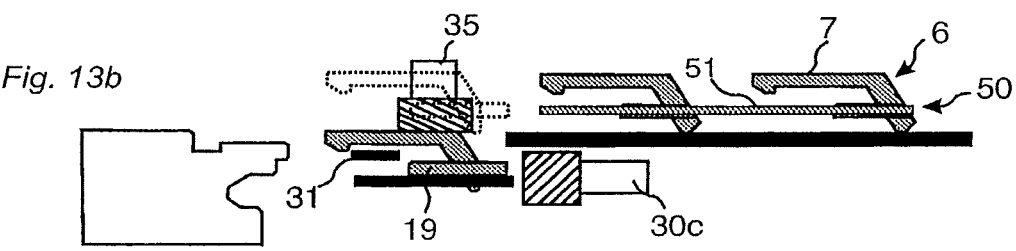
Figure 13C:
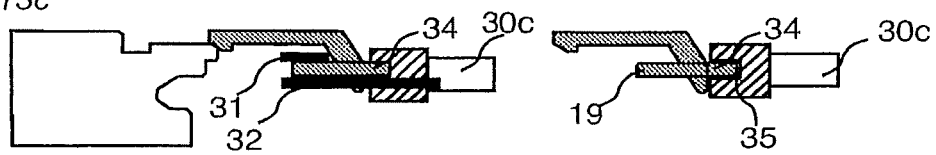
Figure 13D:
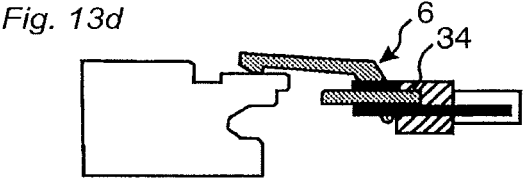
Figure 13E:
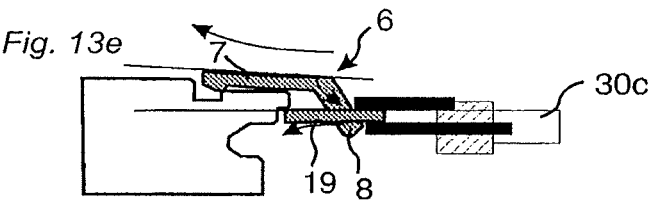
Figure 13F:
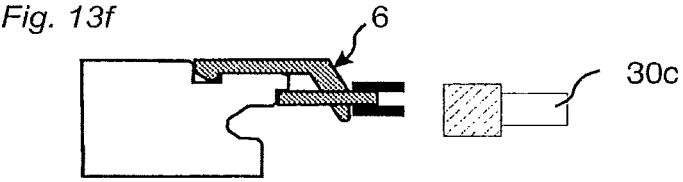

The strip parts are displaced in strip blanks towards a displacement device 35 that preferably displaces the strip parts vertically to a plane in front of several hammers 30a-30c. The strip parts are preferably also separated from each other and from the blank 50 by the displacement device. FIG. 13a shows a strip blank 50 seen from above and FIG. 13b show the cross section seen from the side. FIGS. 13c-13f show how a strip part is fixed to an edge with essentially a snapping action when the strip part is guided with high precision by the guiding rails 31, 32 and the locking protrusion 19 with its locking extension 34. The strip body 7 may bend but also turn in relation to the locking protrusion 19 as shown in FIG. 13e. The connection between the locking element 8 and the locking protrusion may be formed such that a small turning may take place and this may facilitate the insertion of the strip and reduce the requirements on the flexibility of the strip body 7. A snapping may be obtained even if the strip body 7 is rather rigid and compact since the turning in relation to the locking protrusion 19 may be sufficient to allow a snapping action. The locking protrusion 19 may also be flexible and bend during the fixation of the strip. The hammer may comprise a hammer groove 35 as shown in FIG. 13c and this may be used to feed and position the strip parts as a complement or alternative to guiding rails. The guiding surfaces may in such an embodiment be somewhat inclined.

FIGS. 14a to 14d show a part of panel with strip parts on the long and on the short edges. The strip blank comprises preferably the same number of strip parts that are connected to an edge. The strip parts may have a length of, for example, about 1-10 cm. Each strip, part may be designed to handle a locking force of 10-100 kg. The distance between the strip parts may be 5-20 cm. As a non-restricted example it may be mentioned that a preferred embodiment for a laminate flooring panel with a length of about 1.2 m is a panel that comprises 6 strip parts which are about 4 cm long and attached with a centre distance of about 20 cm and 10 cm from the short edges. Each strip part may be designed such that it has a locking strength of about 60 kg in the horizontal direction. The locking system will have a locking strength of 300 kg/m and this is generally sufficient for a laminate floor.

Strip parts are especially suitable for thicker laminate floorings with a thickness of 9-15 mm, high quality floors with a HPL, plastic or powder based surface or solid wood floors. The material waste in such floors is considerable when a locking system is formed with a conventional machined strip made in one piece with the core. Strip parts are also suitable in so called plastic LVT floors that have an expensive and soft core, which is not suitable to form a rigid strip.

Parquet flooring with a lamella core are difficult to machine since the machining is made cross wise to the fibre orientation in the lamellas. Strip parts may solve such problems.

The cost to produce a conventional locking system in solid wood floor is very high and the locking system is generally of a low quality. The stress on the locking system is very high due to the fact that the edges and the strip swells, shrinks and bends. Separate strip parts are therefore especially suitable for this application.

Preferably, the long edges may comprise a locking system with strip parts that may be locked by angling and the short edges may comprise a locking system with cooperating hooks that may be locked by vertical folding.

Strip parts on any of the opposite long or short edges may be combined with all known locking systems on the other opposite edges.

The disclosure does not exclude strip parts attached both opposite edges that lock between each or into each other along the joint.

Strip parts may also be used to decrease the friction along the joint in, order to facilitate displacement and horizontal snapping of the short edges. Plastic material may have a low friction and the contact area between the strips and the locking groove 14 in an adjacent edge may be reduced by more than 80% compared to a conventional locking system.

Strip part may also be used to increase friction between long edges and prevent displacement along the edges such that the short edges are locked horizontally by the long edges. Special protrusions extending vertically or horizontally from the locking element 8 and/or additional flexible locking elements that press against the edge of the adjacent panel 1', preferably against a part of the locking groove 14, may easily be formed on the strip parts by injection mouldings.

The strip parts may compose special material such as, for example, wax that facilitates angling and/or snapping and that reduces the risk for squeaking sound after installation.

Figure 15A:
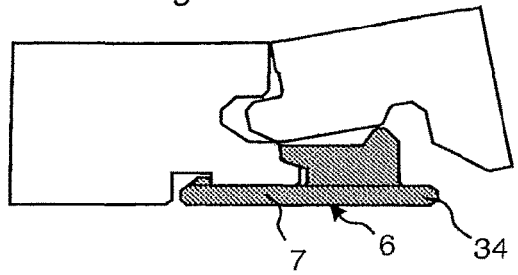
FIGS. 15a-15d illustrate forming of strip parts by machining according to an embodiment of the disclosure.
Figure 15B:
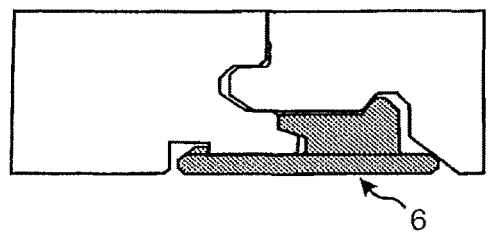
Figure 15C:
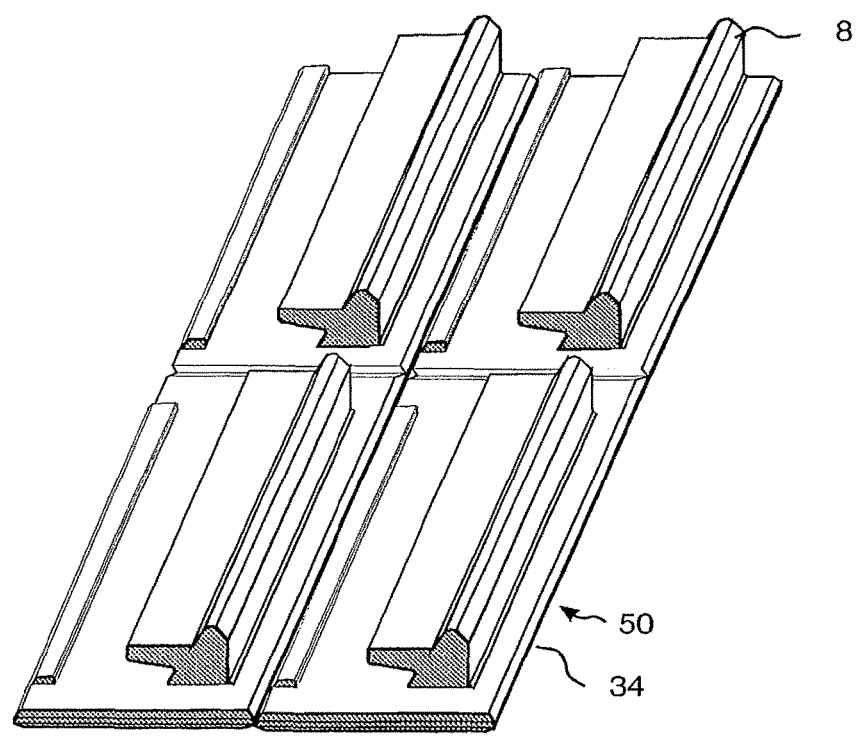
Figure 15D:
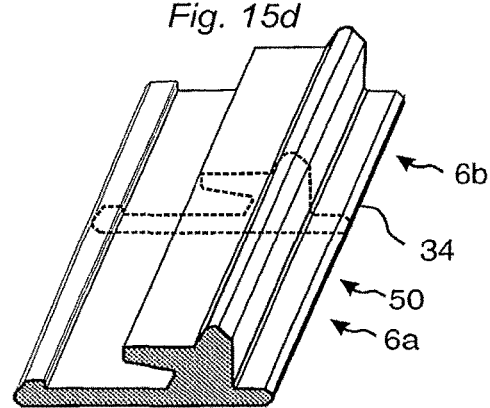
Figure 16A:
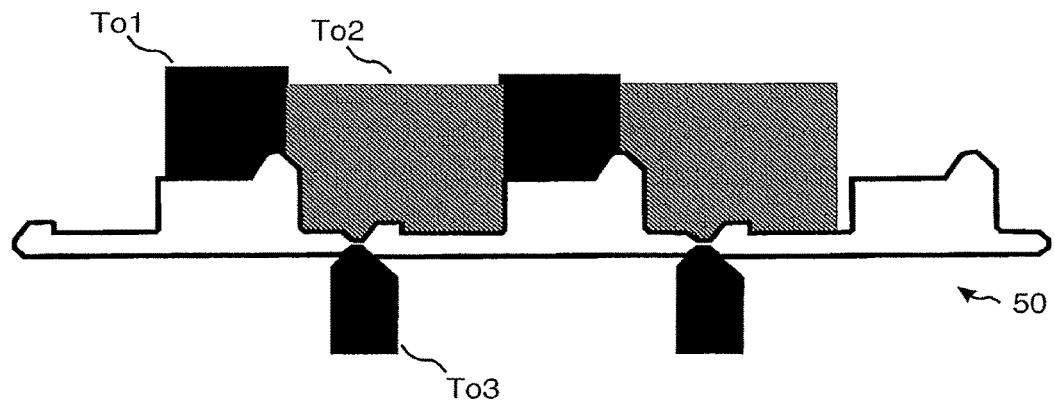
FIGS. 16a-16d illustrate forming of strip parts by machining according to a embodiment of the disclosure.
Figure 16B:
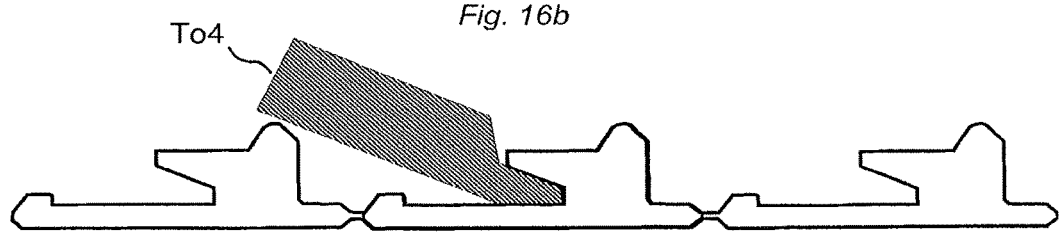
Figure 16C:
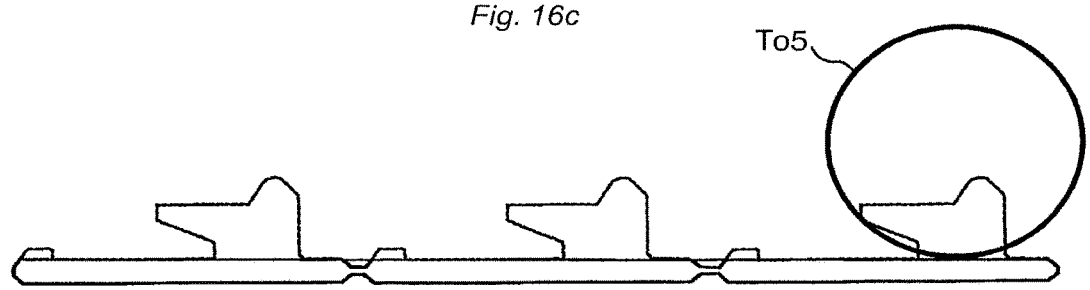
Figure 16D:
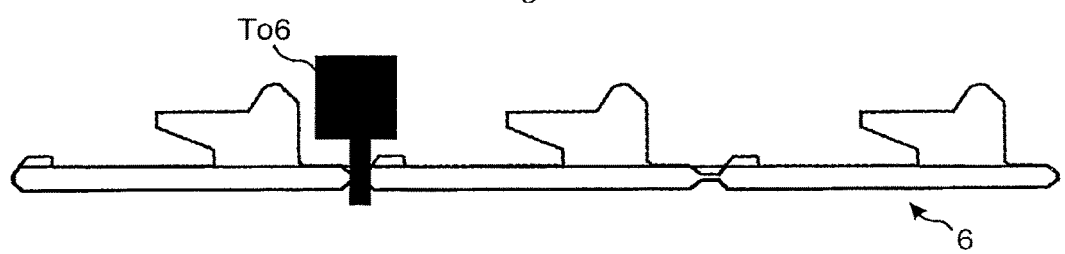

FIGS. 15a-15c, show that strip blanks 50 and strip parts 6 may be formed by machining of a wood based or plastic based sheet material. A locking, extension 34 may be formed on the strip body that, as shown in this embodiment, extends horizontally beyond the locking element. FIG. 15d shows that the strip blank 50 may comprise a long extruded or machined section that is prior to fixing divided into several strip parts 6a, 6b by a rotating tool that also forms locking extensions as shown in FIG. 16c.

FIGS. 16a-16d show a production method to form strip blanks 50 and strip parts 6 by machining of a wood based or plastic based sheet material. The cross sections are formed by rotating tools To1, To2, To3 and To4. The sections are thereafter partly separated by a rotating tool To5 cross wise and finally separated by a punching tool To6 during the fixing of the strip part 6.

FIGS. 17a and 17b show a strip blank 50 with cavities 34 formed by punching between strip parts in order to facilitate the final separation. The strip blank 50 comprises at least two strip parts 6a, 6b connected side by side in at least two rows R1 and R2. A strip part may preferably comprise 5-10 strip, parts connected side, by side in 5-30 rows. The strip blanks are preferably designed such that they may be stacked on top of each other.

Figure 18A:
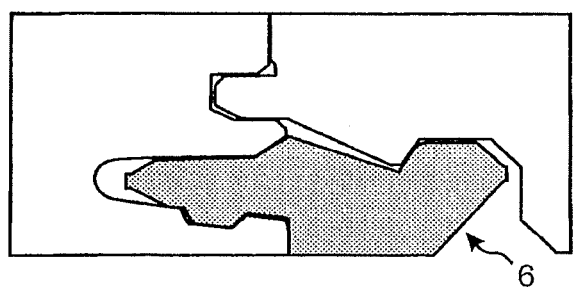
FIGS. 18a-18d illustrate embodiments of the disclosure.
Figure 18B:
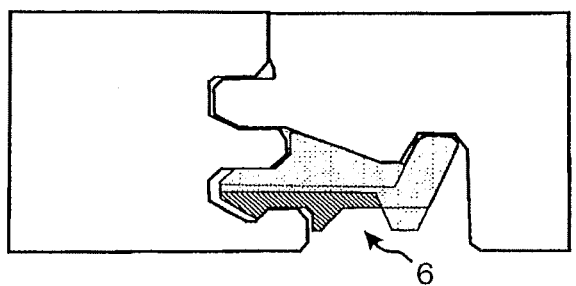
Figure 18C:
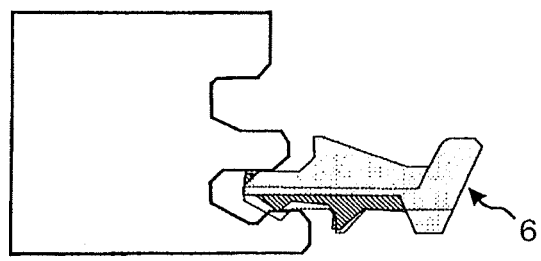
Figure 18D:
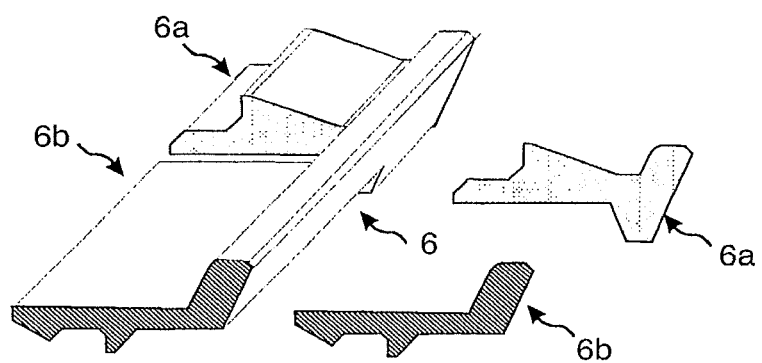

FIG. 18a shows a strip part that is connected into a groove formed in an edge. Such known strip part may also be produced in strip blanks according to the described production methods. One disadvantage with strips that are inserted into a horizontally extending groove formed in the panel edge is that the core must be made of a material with sufficient flexibility. A strip 6 that has a flexible inner part may solve this problem. Such a strip may be formed as an injection-moulded component that comprises two cross sections 6a, 6b along its length as shown in FIGS. 18c and 18d.

Figure 19A:
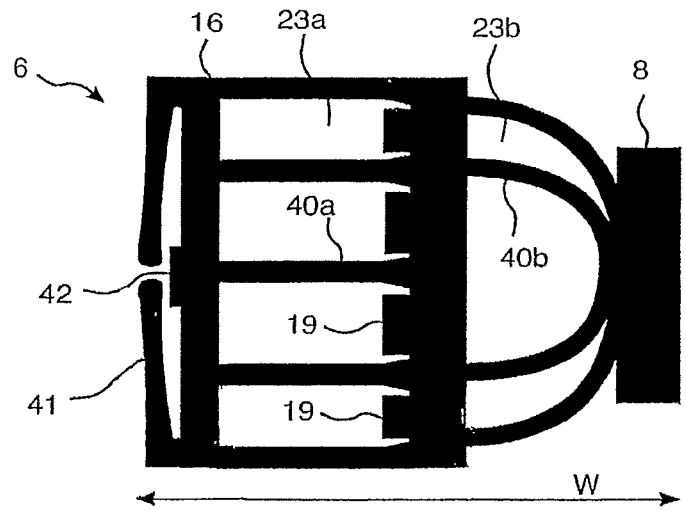
FIGS. 19a-19c illustrate a strip part with a flexible locking part.
Figure 19B:
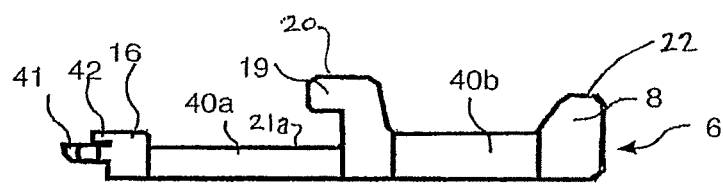
Figure 19C:
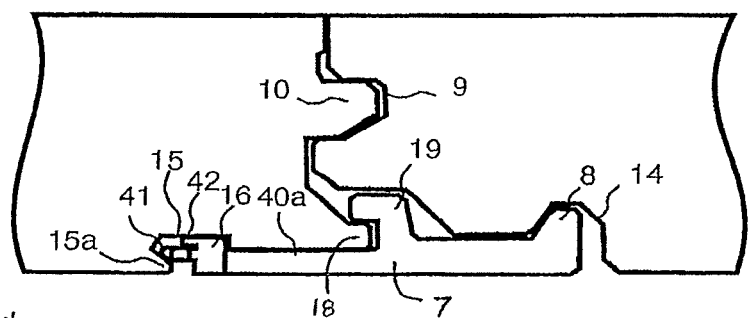
Figure 19D:
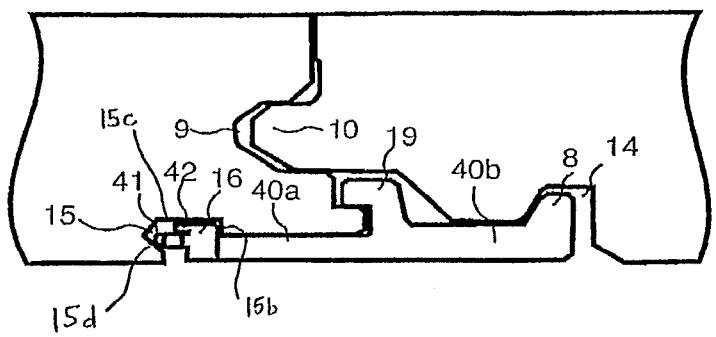

FIGS. 19a-d show a strip, part 6 that may be used to, for example, lock solid wood floors that have a considerable swelling and shrinking across the fibre direction. FIG. 19a shows the strip part 6 seen from above and FIG. 19b shows a cross section. The fixing element 16 comprises a flexible locking part 41 and an undercut 15a formed in the fixing groove 15 that prevent the strip part 6 to be disconnected during transport and installation. The fixing groove includes a first wall 15b, bottom wall 15c, and a second wall 15 as shown in FIG. 19d. The flexible locking part 41 is prevented to flex vertically upwards by a blocking part 42 when the flexible, locking part 41 is compressed towards the fixing element 16 and under the blocking part 42. The strip part comprises cavities 23a, 23b in its inner and outer parts with walls 40a, 40b that may be essentially parallel with the width W of the strip part 5 or they may be rounded or curved such that the strip part may be flexible along its width W. This flexibility may be used to compensate swelling and shrinking of the floor panel or to compensate production tolerances.

FIGS. 19c and 19d show that the strip part may be connected to an edge comprising the tongue 10 or the tongue groove 9.

Figure 20A:
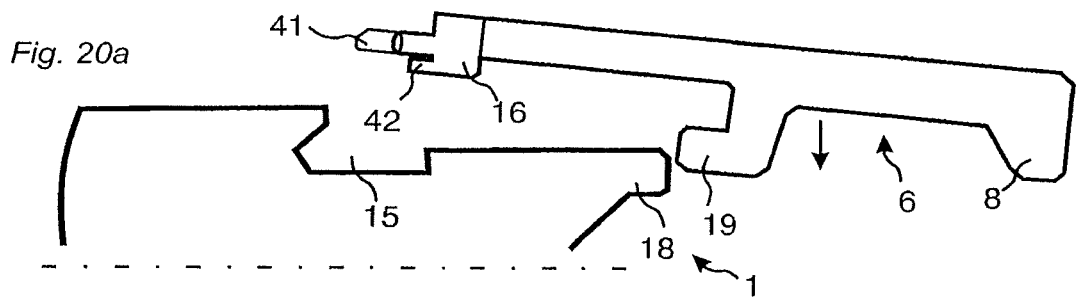
FIGS. 20a-20e illustrate fixing of a strip part with horizontal displacement and turning.
Figure 20B:
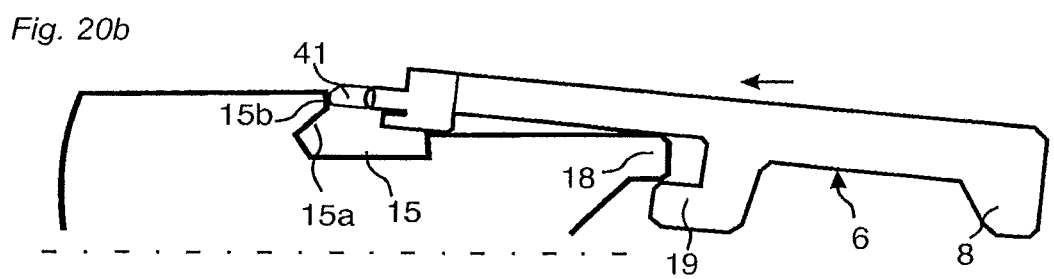
Figure 20C:
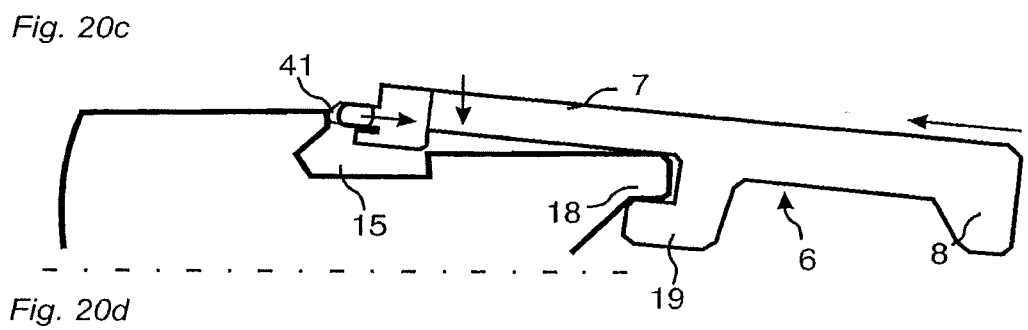
Figure 20D:
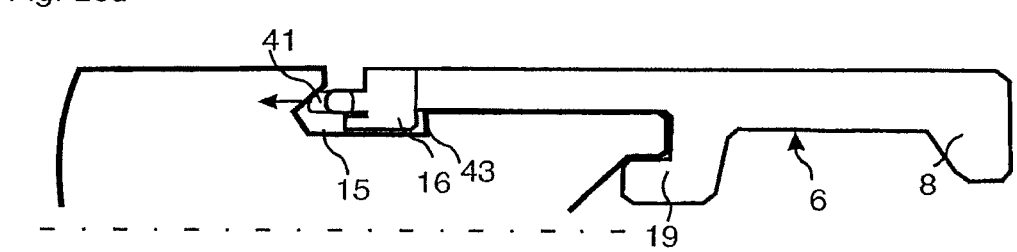
Figure 20E:
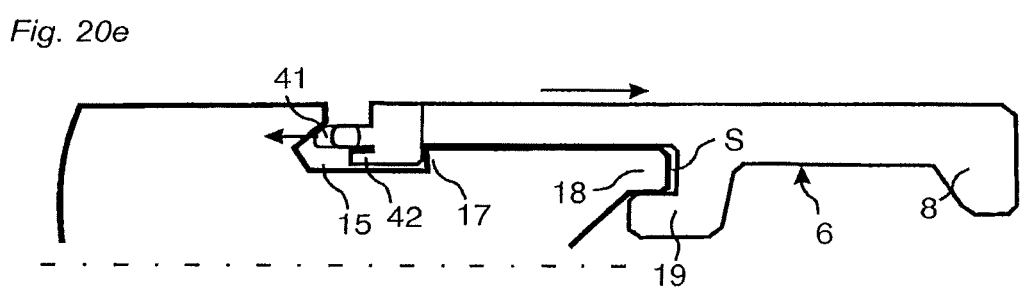

FIGS. 20a-20e show fixing of a strip part 6 comprising a fixing element 16 with a flexible locking part 41. The strip part is displaced vertically or horizontally in an angled position towards the panel edge such that it reaches a position where the holding and locking protrusions 18,19 partially overlap each other and the flexible locking part 41 is in contact with an edge part 15b of the fixing groove 15 as shown by FIGS. 20a and 20b. The edge part 15b comprises preferably an essentially vertical edge. The strip part is thereafter pressed horizontally inwardly such that the flexible locking part 41 is compressed and the strip part is angled such that the fixing element 16 is inserted into the fixing groove 15 as shown in FIGS. 20c and 20d. There may be a play 43b between the fixing groove 15 and the fixing element 16 and such a play facilitates fixing with angling. The fixing element and the fixing groove may have locking surfaces that exceed 90 degrees. FIG. 20e shows that the pre tension of the flexible locking part 41 will press the strip part outwardly such that the locking surfaces 17 are in contact and the strip part will be firmly connected to the panel edge.

Figure 21A:
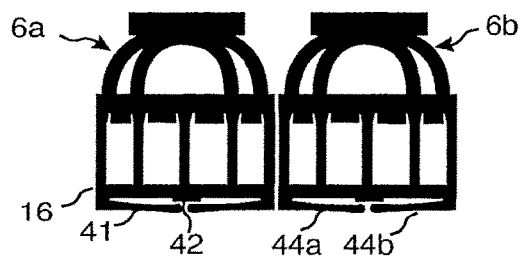
FIGS. 21a-21d illustrate embodiments of strip parts and fixing of strip parts.

The strip parts 6 may be produced and delivered as individual elements. They may have a form that makes it possible to position the individual strip parts side by side automatically by shaking, rotation etc. as shown in FIG. 21a.

Figure 21B:
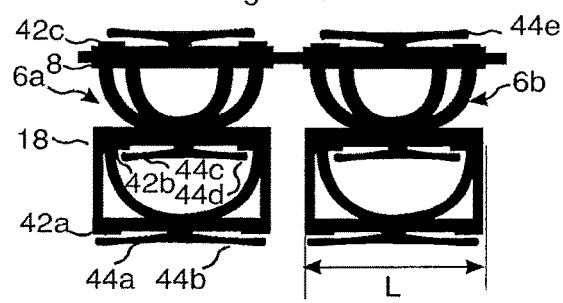
Figure 21C:
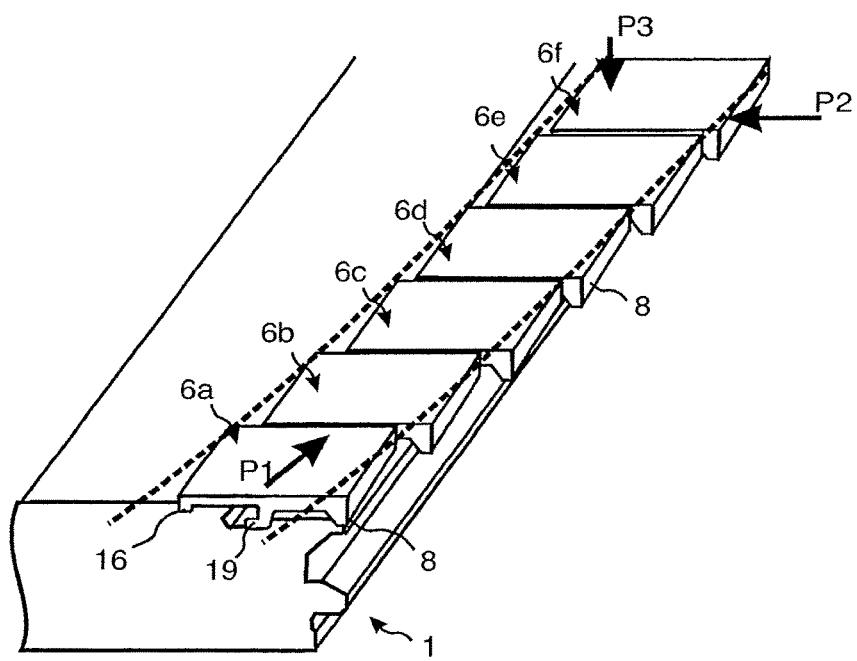

The strip parts may have one or several flexible locking parts 41 that may be formed in the fixing element as snapping tabs or snapping hooks. The flexible locking parts are preferably formed as flexible protrusions 44a, 44b extending and flexing along the fixing element 16 and in the length direction L of the strip part 6. A pair of flexible protrusions 44a, 44b may be oriented towards each other as shown in FIG. 21a or away from each other as shown in FIG. 21b. The cooperating blocking part 42 is preferably located opposite an outer part of a flexible protrusion.

FIG. 21b shows that flexible parts or protrusions 44c,d with cooperating blocking parts 42b may also be formed on the holding protrusion 18 and this allows that the strip part 6 may be connected to a panel edge with vertical snapping. Flexible parts or protrusions 44e that lock against a wall of the locking groove 14 and cooperating blocking parts 42c may also be formed on the locking element 8 and this may be used to prevent the locking element 8 to snap out from the locking groove 14 in order to increase the locking strength. All embodiments may be partly or completely combined with each other.

Strip parts 6a-f may be fixed to the edge by a displacement along the panel edge. A pressure force P1 may be used to displace the strip parts along the edge until they reach an end position where hey are pressed horizontally P2 and vertically P3 such that they may be connected to the panel edge as shown FIGS. 20a-20e. Wheels and rulers may be used to displace and angle the strip parts into the required positions. The mechanical connection may be combined with glue.

Figure 21D:
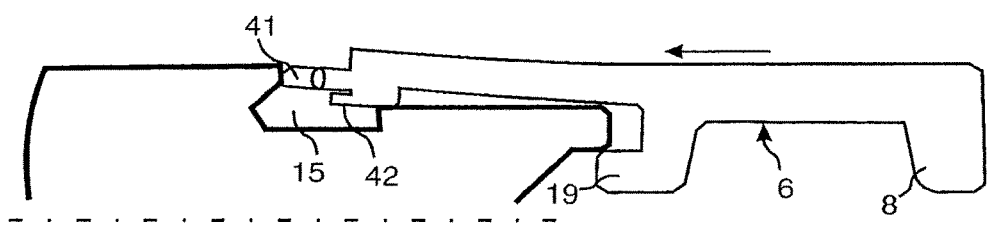

FIG. 21d shows that a strip part 6 with flexible locking part 41 may be connected to a panel edge with an essentially horizontal snap action.

The invention claimed is:

1. Building panels including a first panel and a second adjacent panel, the building panels being provided with a locking system for vertical and horizontal locking of a first edge of the first panel and a second edge of the second adjacent panel, said locking system comprises a tongue and a tongue groove for vertical locking and strip parts attached to the first edge for horizontal locking, wherein the strip part is distinct from the tongue and the tongue groove, and wherein each strip part comprises:
    an upwardly extending locking element configured to cooperate with a downwardly open locking groove formed at the second edge;
    a strip body with an inner part that extends inwardly from the first edge and at a rear side of the first panel and an outer part that extends outwardly from said first edge, the inner part comprises a fixing element that cooperates with a downwardly open fixing groove, formed on the rear side of the first panel, and locks the strip part to the first edge in a first horizontal direction;
    a locking protrusion, located above the inner part of the strip body, that locks the strip part to the first edge vertically and in a second horizontal direction against a holding protrusion formed at the first edge; and
    upper and lower guiding surfaces that are essentially parallel with the strip body,
    wherein the strip part is configured to be attached to the first edge with an essentially horizontal snapping action.

2. The building panels according to claim 1, wherein the locking protrusion is vertically spaced from the inner part of the strip body.

3. The building panels according to claim 1, wherein the locking element extends upward higher than the locking protrusion.

4. The building panels according to claim 1, wherein the locking element extends upward higher than the inner part.

5. The building panels according to claim 1, wherein the locking element is an uppermost portion of the strip part.

6. A strip blank comprising a plurality of strip parts configured to lock panels in a horizontal direction such that the panels are adjacent in the horizontal direction in a locked state, the strip parts each being configured to be fixed to a panel edge of one of the panels by essentially horizontal displacement,
- wherein each strip part has an inner part configured to be fixed vertically under the panel edge and an outer part configured to extend outside the panel edge, and
- wherein the strip blank comprises at least two strip parts located side by side along a side-by-side direction in at least two parallel rows, the side-by-side direction being orthogonal to the horizontal direction and to a vertical direction,
- wherein each strip part comprises a locking protrusion having a horizontal extension in the horizontal direction, the locking protrusion being configured to lock the strip part to the panel edge in the vertical direction,
- wherein the outer part comprises a locking element extending upward away from a strip body of the strip part and being configured to lock the panels in the horizontal direction, and
- wherein the locking element extends upward higher than the locking protrusion.

7. The strip blank according to claim 6, wherein the strip parts are configured to be fixed to the panel edge with an essentially horizontal snapping action in said horizontal direction.

8. The strip blank according to claim 6, wherein the strip parts are configured to be separated from the strip blank by a vertical displacement of the strip parts.

9. The strip blank according to claim 6, wherein the strip blank comprises cavities between the strip parts.

10. The strip blank according to claim 6, wherein the inner part comprises a fixing element configured to lock the strip part to the panel edge in the horizontal direction.

11. The strip blank according to claim 10, wherein the fixing element comprises a flexible locking part.

12. The strip blank according to claim 10, wherein the locking element extends upward higher than the inner part.

13. The strip blank according to claim 6,
- wherein the locking element is directly connected to the horizontal extension of the locking protrusion.

14. The strip blank according to claim 6, wherein the outer part comprises a locking extension formed on or being part of the locking protrusion, the locking extension being configured to guide the strip parts during fixation to the panel edge.

15. The strip blank according to claim 6, wherein the outer part comprises a locking extension formed on the strip body of the strip part and extending horizontally beyond the locking element.

16. The strip blank according to claim 6, wherein a length of the strip part in a length direction of the strip part varies along a width direction of the strip part.

17. The strip blank according to claim 6, wherein each strip part comprises polymer material and is formed by injection moulding.

18. The strip blank according to claim 6, wherein the strip parts comprise a wood based or plastic based sheet material.

19. The strip blank according to claim 6, wherein a cavity is formed in each of the strip parts.

20. The strip blank according to claim 6, wherein the strip parts are flexible.

21. The strip blank according to claim 6, wherein a strip body of each of the strip parts is thinner in an outer portion of the strip part than in an inner portion of the strip part.

22. The strip blank according to claim 6, wherein the strip blank is a plurality of strip blanks, the plurality of strip blanks being configured to be stacked on top of each other.

23. The strip blank according to claim 6, wherein the locking element is an uppermost portion of the strip part.

24. A method to fix a plurality of strip parts to an edge of a panel, the method comprising:
- separating strip parts from a strip blank comprising the strip parts, which are configured to lock panels in a horizontal direction such that the panels are adjacent in the horizontal direction in a locked state, the strip parts each being configured to be fixed to a panel edge of one of the panels by essentially horizontal displacement, wherein each strip part has an inner part configured to be fixed vertically under the panel edge and an outer part configured to extend outside the panel edge, and wherein the strip blank comprises at least two strip parts located side by side along a side-by-side direction in at least two parallel rows, the side-by-side direction being orthogonal to the horizontal direction and to a vertical direction, wherein each strip part comprises a locking protrusion having a horizontal extension in the horizontal direction, the locking protrusion being configured to lock the strip part to the panel edge in the vertical direction, wherein the outer part comprises a locking element extending upward away from a strip body of the strip part and being configured to lock the panels in the horizontal direction, and wherein the locking element extends upward higher than the locking protrusion;
- displacing the strip parts essentially vertically; and
- pressing and snapping the strip parts to the edge of the panel by an essentially horizontal displacement.

25. The method according to claim 24, wherein the inner part comprises a fixing element configured to lock the strip part to the panel edge in the horizontal direction, and wherein the locking element extends upward higher than the inner part.

26. The method according to claim 24, wherein the locking element is an uppermost portion of the strip part.

* * * * *